(12) United States Patent
Asai

(10) Patent No.: US 9,473,610 B2
(45) Date of Patent: Oct. 18, 2016

(54) INFORMATION PROCESSING PROGRAM, INFORMATION PROCESSING APPARATUS AND INFORMATION PROCESSING METHOD

(75) Inventor: Norihiko Asai, Tajimi (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 741 days.

(21) Appl. No.: 13/429,424

(22) Filed: Mar. 25, 2012

(65) Prior Publication Data

US 2013/0063619 A1    Mar. 14, 2013

(30) Foreign Application Priority Data

Sep. 9, 2011  (JP) .................................. 2011-196650

(51) Int. Cl.
*H04M 1/2745*  (2006.01)

(52) U.S. Cl.
CPC ................................ *H04M 1/27455* (2013.01)

(58) Field of Classification Search
CPC ......................... G06F 17/30165; G06F 17/30
USPC ......................................................... 707/758
See application file for complete search history.

(56) References Cited

U.S. PATENT DOCUMENTS

| | | | |
|---|---|---|---|
| 7,117,256 B1* | 10/2006 | Blinn ............................. 709/219 |
| 8,108,432 B2* | 1/2012 | Westin ................ G06F 17/3028 707/792 |
| 8,205,157 B2* | 6/2012 | Van Os ................. G06F 3/0488 715/702 |
| 8,355,711 B2* | 1/2013 | Heins et al. ................... 455/419 |
| 8,447,769 B1* | 5/2013 | Paris et al. .................... 707/758 |
| 2001/0015823 A1* | 8/2001 | Sato .............................. 358/1.15 |
| 2006/0187227 A1* | 8/2006 | Jung et al. ..................... 345/536 |
| 2008/0001946 A1 | 1/2008 | Ishikawa |
| 2008/0219589 A1* | 9/2008 | Jung .................. H04N 1/00068 382/276 |
| 2009/0248692 A1* | 10/2009 | Tsukagoshi ........... H04L 65/403 |

(Continued)

FOREIGN PATENT DOCUMENTS

| | | |
|---|---|---|
| JP | 2005-049928 A | 2/2005 |
| JP | 2008-003669 A | 1/2008 |

(Continued)

OTHER PUBLICATIONS

Apple iphone image share feature, See attached NPL Google Search Results.*

(Continued)

*Primary Examiner* — Hosain Alam
*Assistant Examiner* — Saba Ahmed
(74) *Attorney, Agent, or Firm* — Merchant & Gould P.C.

(57) ABSTRACT

The information processing apparatus includes: a search unit configured to search an application, which satisfies a condition; a data share unit configured to output location information; and a computer controlled to function as: a first request control unit that requests with a first condition; a first reception unit that receives first application information, satisfying the first condition; a second request control unit that requests with a second condition; a second reception unit that receives second application information satisfying the second condition; a display control unit that displays options to receive an operation of selecting any one of the application indicated by the first application information and the second application information; and an output unit that designates a selected application corresponding to the selected options and outputs location information.

18 Claims, 16 Drawing Sheets

(56) References Cited

U.S. PATENT DOCUMENTS

| | | | | |
|---|---|---|---|---|
| 2010/0202000 | A1* | 8/2010 | Gotoh | H04N 1/46 358/1.9 |
| 2010/0220929 | A1* | 9/2010 | Misawa | G06F 17/30274 382/190 |
| 2010/0306187 | A1* | 12/2010 | Arrouye | G06F 17/301 707/711 |
| 2011/0081923 | A1* | 4/2011 | Forutanpour et al. | 455/457 |
| 2011/0093580 | A1 | 4/2011 | Nagasaka et al. | |
| 2011/0161450 | A1* | 6/2011 | Westin | G06F 17/3028 709/206 |
| 2011/0261415 | A1* | 10/2011 | Otsuka | H04N 1/00209 358/442 |
| 2011/0307491 | A1* | 12/2011 | Fisk | G06F 17/30056 707/741 |
| 2012/0060100 | A1* | 3/2012 | Sherwood | H04N 21/4122 715/748 |
| 2012/0324002 | A1* | 12/2012 | Chen | G06F 17/30274 709/204 |
| 2013/0130711 | A1* | 5/2013 | Bergsbjork et al. | 455/456.1 |
| 2013/0332855 | A1* | 12/2013 | Roman | G06F 3/0481 715/753 |

FOREIGN PATENT DOCUMENTS

| | | |
|---|---|---|
| JP | 2008-227583 A | 9/2008 |
| JP | 2011-090391 A | 5/2011 |

OTHER PUBLICATIONS

Samsung Galaxy phone image share feature, See attached NPL Google Search Results.*

Editor's Review, Free JPG to PDF Converter, Aug. 6, 2013, Free PDF Solutions, Version 1.0, http://download.cnet.com/Free-JPG-to-PDF-Converter/3000-10743_4-75732662.html.*

10 Free Apps to Convert PDF on Smartphones & Tablets, http://www.hongkiat.com/blog/pdf-converter-apps/.*

Any Free PDF to JPG Converter, Tipard Studio, Apr. 3, 2015, LongEasy Co., Ltd, Version 3.0.31 (Note: Version 1.0 released several years ago), https://itunes.apple.com/us/app/any-free-pdf-to-jpg-converter/id683160697?mt=12.*

* cited by examiner

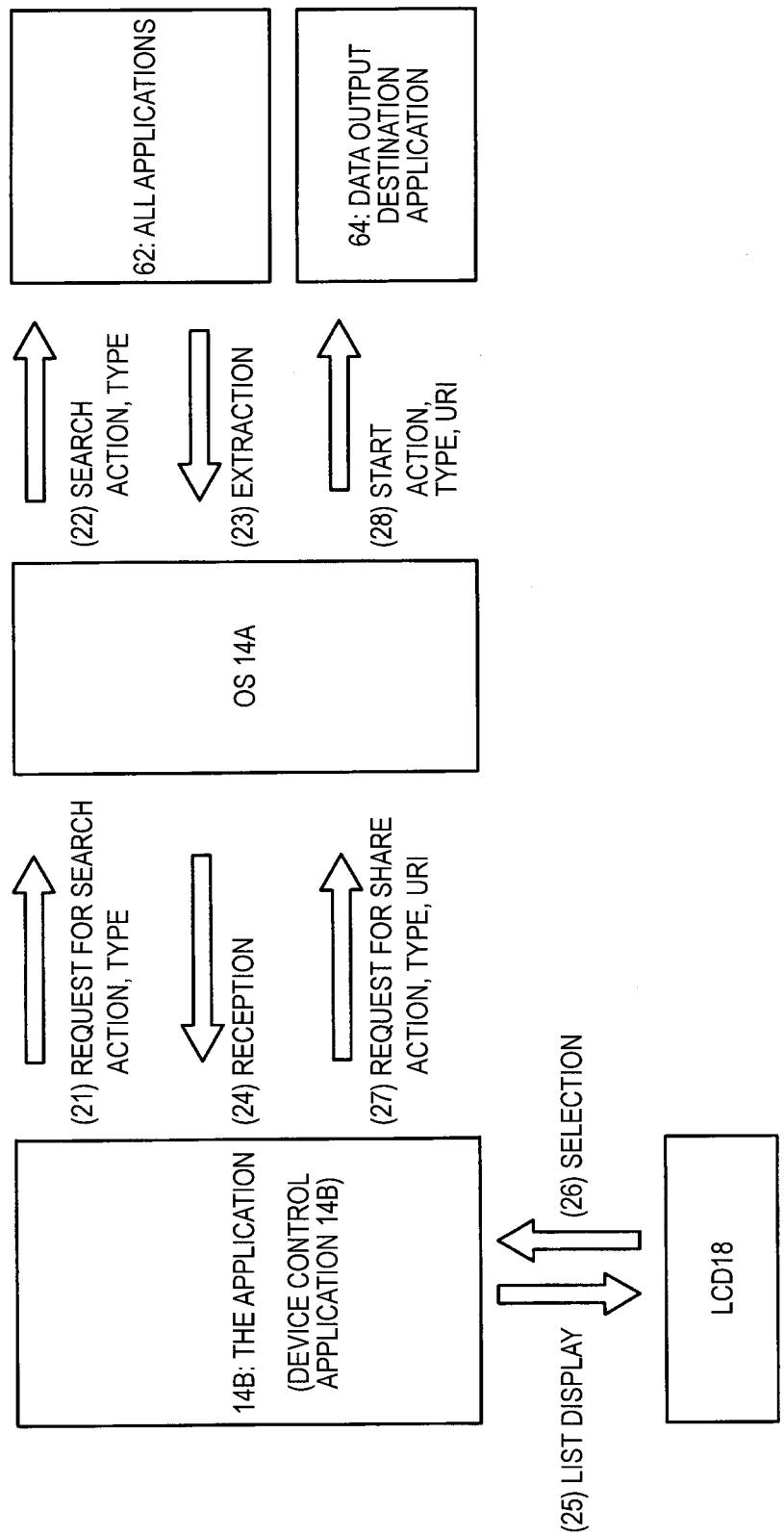

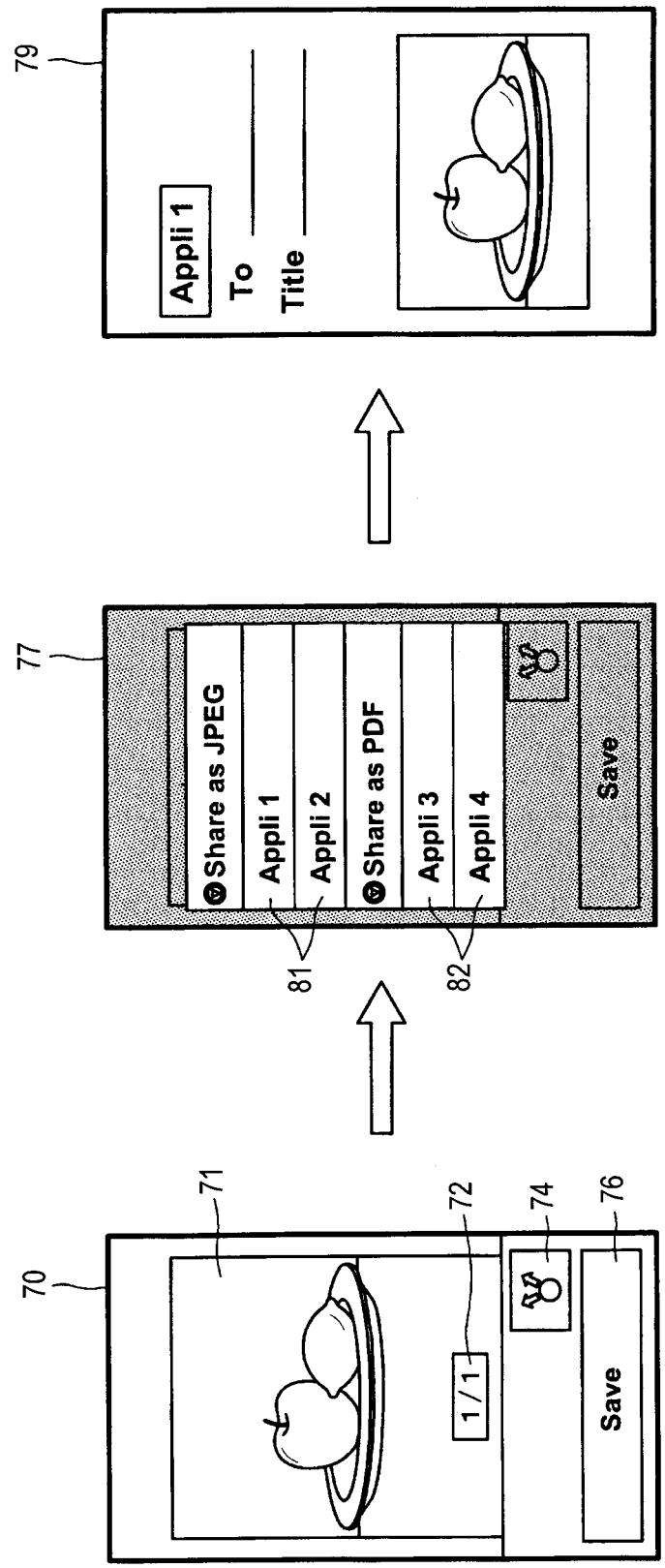

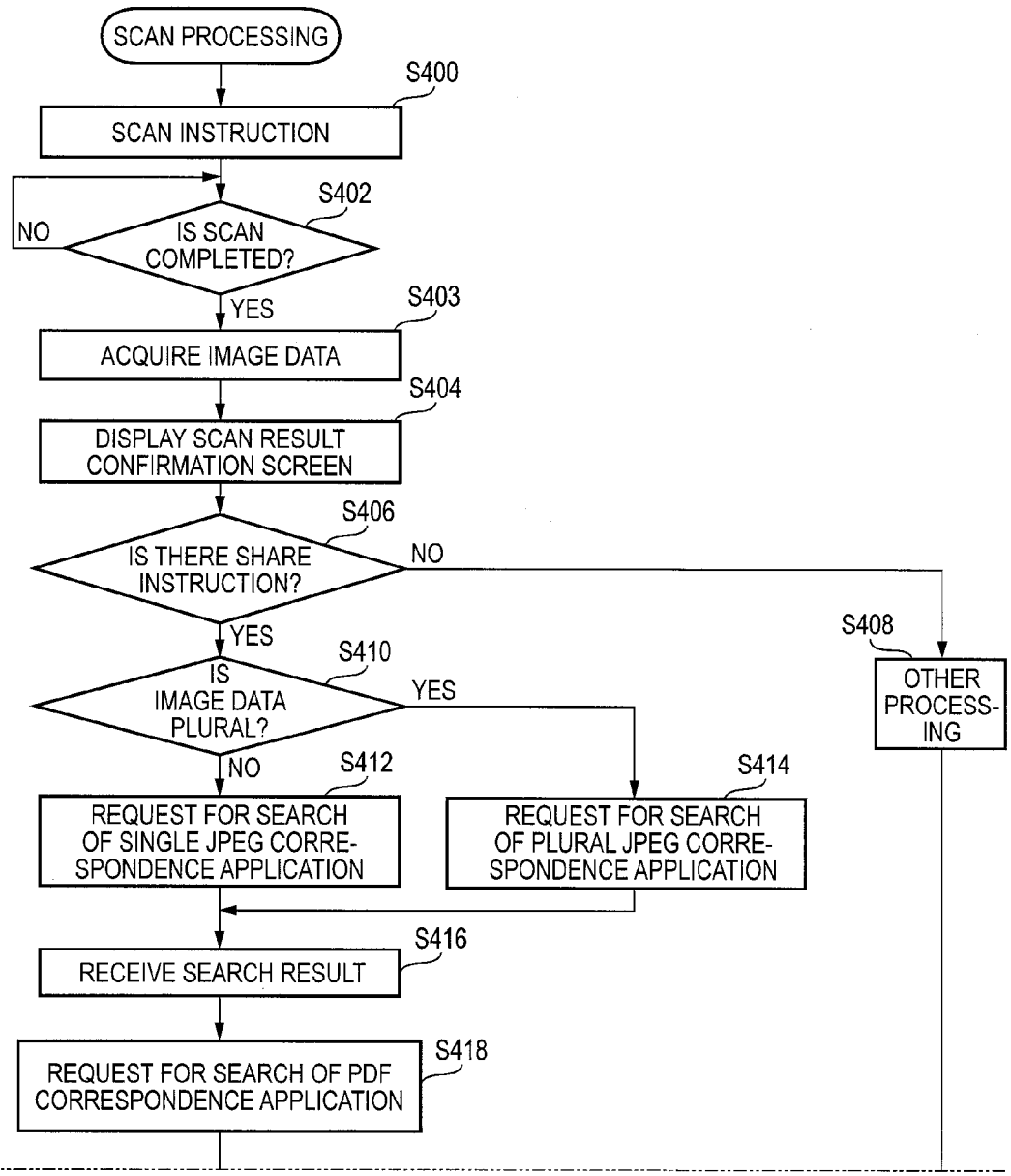

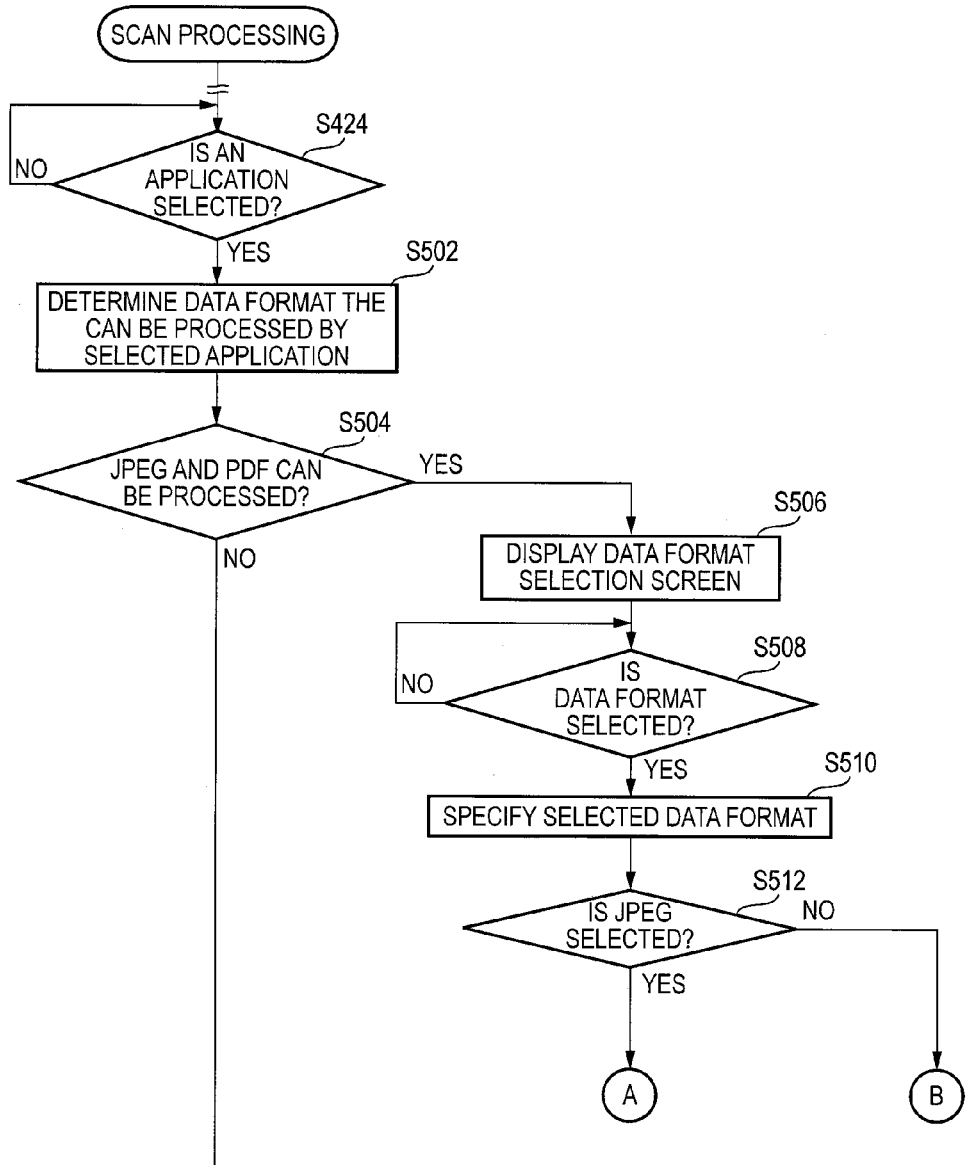

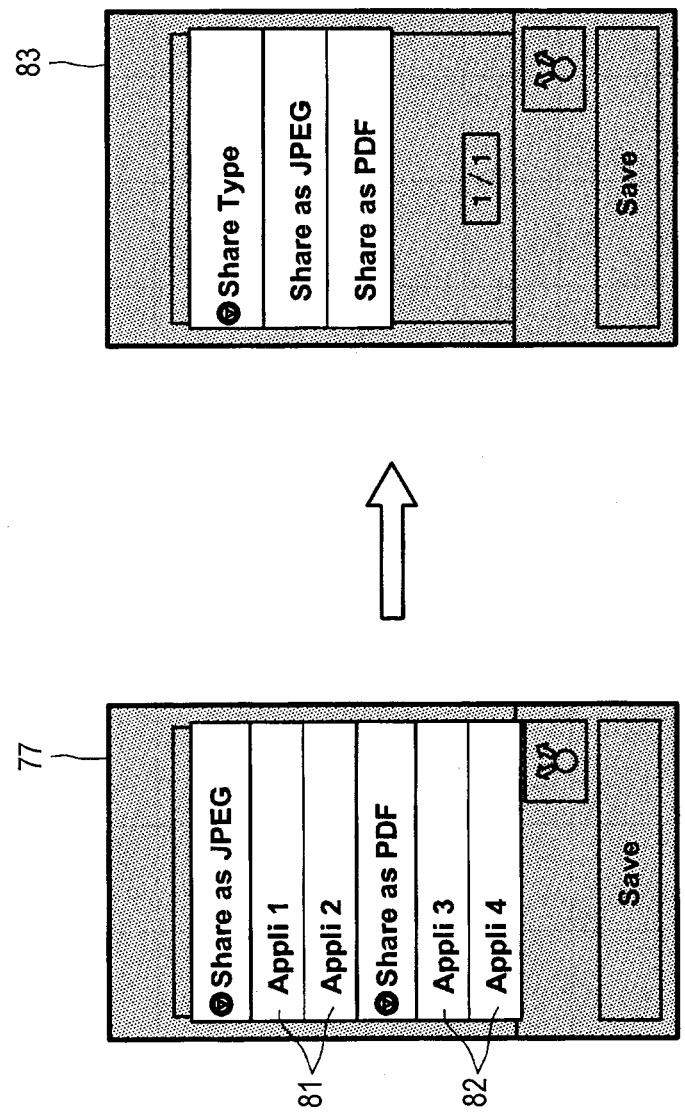

INFORMATION PROCESSING PROGRAM, INFORMATION PROCESSING APPARATUS AND INFORMATION PROCESSING METHOD

CROSS-REFERENCE TO RELATED APPLICATION

This application claims priority from Japanese Patent Application No. 2011-196650 filed on Sep. 9, 2011, the entire subject matter of which is incorporated herein by reference.

TECHNICAL FIELD

This disclosure relates to an information processing program, an information processing apparatus and an information processing method.

BACKGROUND

There is a mobile terminal having a function that is called as a 'share function.' The share function is a function of transferring information (for example, file path) indicating a location of data processed by one application to an application designated as a data output destination and enable the application of the data output destination to process the corresponding data. For example, when image data is captured by a digital camera embedded in the mobile terminal and a JPEG file is made from the image data by a camera application, it is possible to transfer a file path of the JPEG file to an electronic mail application and transmit with attaching the same to an electronic mail by the share function. According to the share function, it is possible to interlock a plurality of applications and to thus enable the mobile terminal to perform various processing. In the meantime, the application that processes the JPEG file is not limited to the electronic mail application, and there may be a variety of applications. For example, the related art discloses a technology of starting different JPEG applications, depending on folders in which the JPEG files are stored.

SUMMARY

In the meantime, it is possible to search the application, which can be designated as the data output destination, by using a function of an operating system (abbreviated to as OS) installed in the mobile terminal. Here, search conditions of the application include a search condition, in which designates a data kind capable of being processed by each application, a search condition, in which designates a processing kind of processing capable of being performed by each application, and the like.

For a developer of an application installed in the mobile terminal, with considering the cost to be consumed for the developing and a burden, it is preferable to configure an application so that an application of the data output destination can be searched by using a search function of the OS installed in the mobile terminal. On the other hand, the search function of the OS has a specification limit such that only one value can be set for first setting item. Therefore, it is difficult to acquire a search result having high convenience.

With taking into consideration the above, this disclosure provides at least an information processing program, an information processing apparatus and an information processing method capable of enabling a search unit of the information processing apparatus to display information that is convenient for a user to select an application of a data output destination.

In view of the above, a non-transitory computer-readable medium having instructions to control a computer of an information processing apparatus, the information processing apparatus including: a search unit configured to search an application, which satisfies a condition, of a plurality of applications, wherein setting values are set for respective setting items in the condition; a data share unit configured to output location information, which indicates a location of data to be output from an application of a data output source, to an application of a data output destination; a display unit; and an operation unit. The instructions controlling the computer to function as: a first request control unit; a first reception unit; a second request control unit; a second reception unit; a display control unit; and an output unit. The first request control unit requests the search unit to perform an application search with a first condition, in which a first setting value is set for a first setting item The first reception unit receives first application information, which indicates an application satisfying the first condition, from the search unit The second request control unit requests the search unit to perform an application search with a second condition, in which a second setting value different from the that of the first condition is set for the first setting item of the first condition The second reception unit receives second application information, which indicates an application satisfying the second condition, from the search unit The display control unit displays options on the display unit to receive an operation of selecting any one of the application indicated by the first application information received by the first reception unit and the application indicated by the second application information received by the second reception unit. The output unit designates, as an application of the data output destination, a selected application, which is an application corresponding to the selected options when the operation unit receives an operation of selecting any one of the options, and outputs location information of indicating data to the data share unit.

This disclosure may be implemented in various ways, such as an information processing apparatus, a control device controlling the information processing apparatus, an information processing system, an information processing method, a non-transitory computer-readable medium having instructions to control a computer, and the like.

BRIEF DESCRIPTION OF THE DRAWINGS

The foregoing and additional features and characteristics of this disclosure will become more apparent from the following detailed descriptions considered with the reference to the accompanying drawings, wherein:

FIG. 2 illustrates search and share functions of an operating system;

FIG. 3 illustrates a screen transition in a mobile terminal;

FIG. 4 is divided into two part of FIG. 4A and FIG. 4B;

FIG. 5 is divided into two part of FIG. 5A and FIG. 5B;

FIG. 6 illustrates a screen transition in the second illustrative embodiment;

FIG. 7 is divided into two part of FIG. 7A and FIG. 7B;

FIG. 9 is divided into two part of FIG. 9A and FIG. 9B;

DETAILED DESCRIPTION

Figure 1:
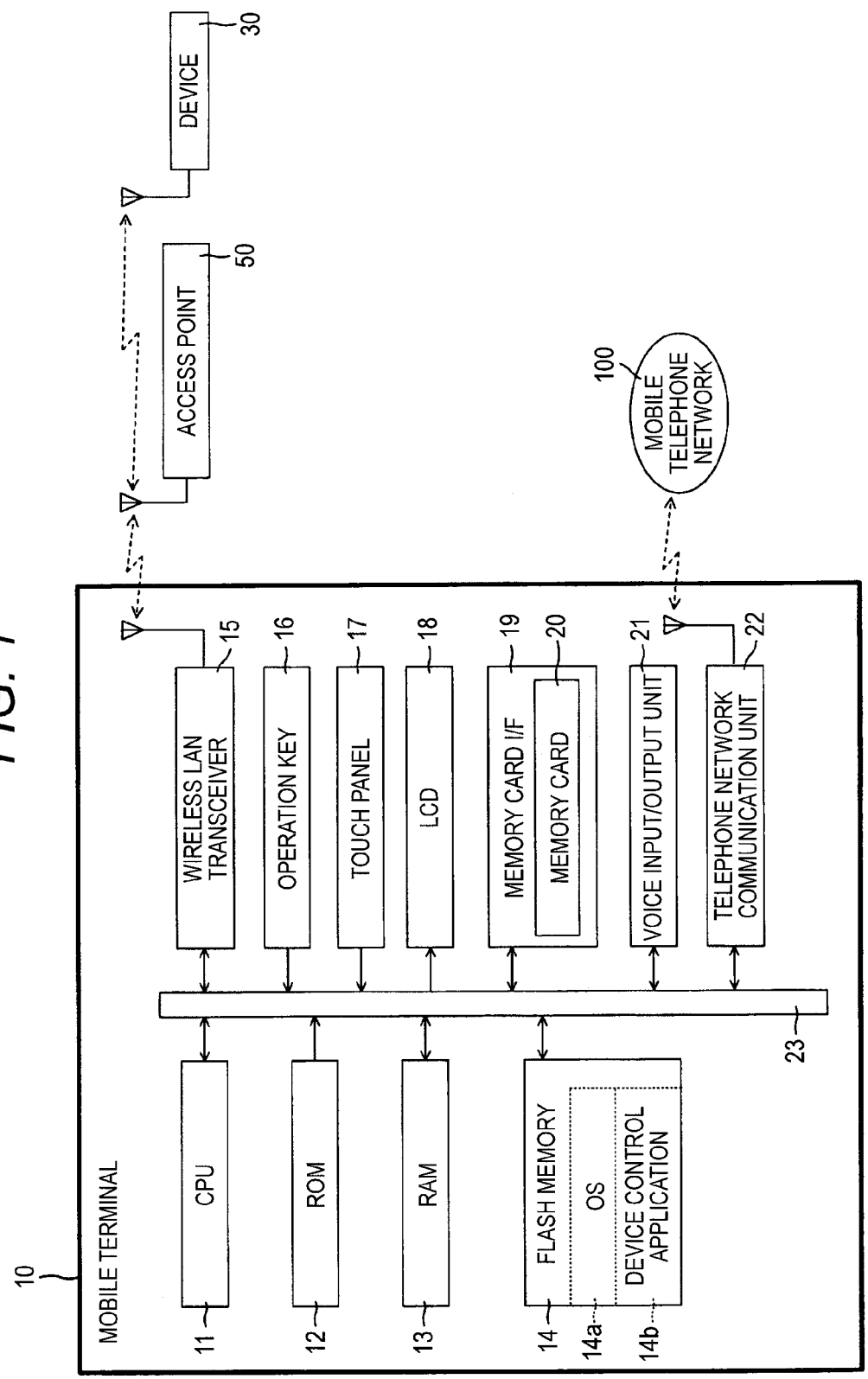
FIG. 1 is a block diagram illustrating an electrical configuration of a mobile terminal having a device control application installed therein according to a first illustrative embodiment of this disclosure.

Hereinafter, illustrative embodiments of this disclosure will be described with reference to the accompanying drawings. FIG. 1 is a block diagram illustrating an electrical configuration of a mobile terminal 10 having a device control application 14b (hereinafter, referred to as the application 14b) installed therein according to a first illustrative embodiment of this disclosure.

A mobile terminal 10 is a mobile telephone that may performs voice communication with another apparatus or may use the internet through a mobile telephone network 100. Also, the mobile terminal 10 performs wireless communication with a device 30 by an infrastructure mode in which an access point 50 is interposed therebetween. The mobile terminal 10 has a CPU 11, a ROM 12, a RAM 13, a flash memory 14, a wireless LAN transceiver 15, an operation key 16, a touch panel 17, a liquid crystal display apparatus 18 (hereinafter, referred to as LCD 18), a memory card interface 19 (hereinafter, referred to as memory card I/F 19), a voice input/output unit 21 and a telephone network communication unit 22. These are connected to each other via a bus line 23.

The CPU 11 controls the respective units connected to the bus line 23, in response to fixed values or programs stored in the ROM 12 and the like. The ROM 12 is a non-rewritable and non-volatile memory and the RAM 13 is a rewritable and volatile memory. The flash memory 14 is a rewritable and non-volatile memory and stores an operating system 14a (hereinafter, referred to as OS 14a), a the application 14b and the other applications (not shown). The OS 14a is basic software to implement standard functions of the mobile terminal 10 and is an ANDROID (registered trademark) OS in this illustrative embodiment. The application 14b is an application that is provided by a vendor of the device 30 and is installed in the mobile terminal 10 by a user.

In the below, the CPU 11 that executes programs such as application, operating system, and the like may be also described just by a program name. For example, the description of 'application' may also mean the 'CPU 11 that executes an application.'

As an application uses an Application Program Interface (which is abbreviated to as "API") of the OS 14a installed in the mobile terminal 10, a function of searching an application and a share function (which is also called as Intent function) of passing data between applications are implemented. The functions are described with reference to FIG. 2. The application 14b is an application for directly using printing and scan functions of the device 30 from the mobile terminal 10 without passing through a personal computer and the like. Specifically, the application 14b is configured to display application information, which is convenient for a user to select an application of a data output destination, by using the search function of the OS 14a.

The wireless LAN transceiver 15 is a circuit that Wi-Fi (registered trademark) connects the mobile terminal 10 and another device each other by a wireless LAN based on the protocol of IEEE802.11b/g. By the wireless LAN transceiver 15, the mobile terminal is wirelessly connected to the device 30 via the access point 50.

The operation key 16 is a hard key that is provided to a housing of the mobile terminal 10 to input setting information or instruction to the mobile terminal 10. The touch panel 17 is provided to overlap with the LCD 18 to input setting information or instruction to the mobile terminal 10. The LCD 18 displays a variety of operation screens and an image based on selected data. The memory card I/F 19 is an interface to which a non-volatile memory card 20 is mounted, and controls writing or readout of data to or from the memory card 20. The memory card 20 is an SD card (registered trademark), for example. In this illustrative embodiment, the application 14b converts scan data (one example of image data) received from the device 30 into a file having a PDF format (hereinafter, referred to as "PDF data") or file having a JPEG format (hereinafter, referred to as "JPEG data") and stores the converted data in the memory card 20.

The voice input/output unit 21 is a device for voice input/output including a microphone, a speaker and the like, and the telephone network communication unit 22 is a circuit for communication through the mobile telephone network 100. The mobile telephone network 100 is an International Mobile Telecommunication-2000 (which is abbreviated to as IMT-2000) communication network and enables the voice communication by the mobile terminal 10.

In the meantime, each of the applications (including the application 14b) installed in the mobile terminal 10 call the API of the OS 14a and outputs data intended to be transmitted to the respective configurations of the wireless LAN transceiver 15, the operation key 16, the touch panel 17, the LCD 18, the memory card I/F 19, the voice input/output unit 21, the telephone network communication unit 22 and the like, to the OS 14a. That is, each application calls the API of the OS 14a, thereby controlling each configuration of the mobile terminal 10. Also, each application calls the API of the OS 14a, thereby obtaining data that is output by each configuration of the mobile terminal 10 or data indicating a state of each configuration from the OS 14a. That is, each application calls the API of the OS 14a, thereby obtaining the data, which indicates a state of each configuration (also including an operation input state to the mobile terminal 10) of the mobile terminal 10, from the OS 14a. Also, the OS 14a notifies each application of the data output by each configuration of the mobile terminal 10, or data indicating a state of each configuration periodically or every when each configuration state changes. That is, each application receives the notification from the OS 14a and thus obtains the data, which indicates a state of each configuration (also including an operation input state to the mobile terminal 10) of the mobile terminal 10, from the OS 14a.

The device 30 is a complex machine having printer, scan, copying functions and the like, has a wireless LAN transceiver (not shown) having the same configuration as the wireless LAN transceiver 15 of the mobile terminal 10 and is Wi-Fi-connected to the mobile terminal 10 by the wireless communication via the access point 50. Also, the device 30 is controlled by the application 14b of the mobile terminal 10, prints an image based on data transmitted from the mobile terminal 10 or reads a document image to generate image data and transmits the image data to the mobile terminal 10.

FIG. 2 is a pictorial view illustrating search and share functions of the OS 14a and shows a flow of processing when the application 14a requests an execution of the search function from the OS 14a and then designates an application of a data output destination (hereinafter, referred to as data output destination application 64) to request execution of the share function. The search function is a function of searching an application of a plurality of application, which satisfies a condition, with conditions in which setting values are designated for respective setting items. In the meantime, the share function is a function of outputting a Uniform Resource Identifier (which is abbreviated to as URI), which indicates a location of data output from an application of a data output source (the application 14b in the example shown in FIG. 2), to the data output destination application 64, thereby enabling the application of the data output destination to process the data.

First, the application 14b calls the API of the OS 14a and requests an application search from the OS 14a (process 21). The setting items of the search condition include a 'TYPE' indicating a data format that can be processed by each application and an 'ACTION' indicating a kind of processing that can be performed by each application. The application 14b designates values for the TYPE and ACTION and requests the search. In the meantime, the application may designate a value for any one of the TYPE and ACTION or may designate values for both of them. However, for one search request, it is possible to set only one value for the TYPE and ACTION, respectively.

In the meantime, based on the search condition designated by the application 14a, the OS 14a searches an application satisfying the search condition from all applications installed in the mobile terminal 10 (hereinafter, referred to as all the applications 62) (process 22).

Specifically, each application installed in the mobile terminal 10 preliminary declares the TYPE indicating a processable data format of the that application, and the ACTION indicating a kind of processing that can be performed by the that application. Accordingly, the OS 14a extracts an application having a declaration corresponding to the search condition from all the applications 62 and acquires identification information thereof (process 23). Meanwhile, the TYPE and ACTION declared by each application can be freely set by a developer of the correspondence application. Therefore, each application may declare a TYPE or ACTION that does not actually correspond. Hence, the 'application satisfying a condition' means an application having a declaration corresponding to the search condition requested by the application 14b and does not require an application that can perform the processing as it is declared.

Then, the application 14b receives application information (for example, application name) of the applications satisfying the search condition searched by the OS 14a from the OS 14a (process 24), displays an application information list on the LCD 18 (process 25) and then receives a user's selection (process 26).

Then, the application 14b designates, as the data output destination application 64, an application of the application information list selected by the user, outputs the URI indicating the location of the data to the OS 14a together with the TYPE and ACTION, and requests execution of the share function from the OS 14a (process 27).

Then, the OS 14a starts the data output destination application 64 designated by the application 14b, sets a screen of the data output destination application 64 as a foreground and outputs the URI, TYPE and ACTION of the data notified from the application 14b (process 28).

As a result, the screen of the data output destination application 64 selected by the user is displayed as a foreground on the mobile terminal 10, and the data output destination application 64 accesses data specified by the notified URI and performs processing in response to the ACTION notified from the OS 14a. For example, it is performed that the processing can be performed in the data output destination application 64 such as display output, attachment to an electronic mail and transmission thereof, editing and the like. By the share function, the user can use the function of the application 14b and the function of the data output destination application 64 with combining, so that the convenience is improved.

FIG. 3 illustrates screen transitions when a user instructs the execution of the share function for image data acquired from the device 30 at a state in which the screen of the application 14b is displayed as a foreground.

When the application 14b acquires image data from the device 30, it displays a scan result confirmation screen 70 of the application 14b on the LCD 18 and displays a scan image 71 corresponding to the image data in the scan result confirmation screen.

The scan result confirmation screen 70 further includes a page display area 72, a share button 74 and a save button 76. The page display area 72 is an area that displays the total number of pages of documents read by the device 30 and a page number indicating a page number of the scan image 71 being currently displayed of all pages.

The share button 74 is an area for inputting an instruction to perform the share function. When the user touches the share button 74, the image data corresponding to the scan image 71 in the display is determined as data to be shared.

The save button 76 is an area for inputting an instruction to perform a save function. When the user touches the save button 76, the image data corresponding to the scan image 71 in the display is saved. Specifically, the image data is converted into a file having a predetermined data format, and then the image data is stored in the memory card 20 as the API of the OS 14a is called.

In the scan result confirmation screen 70, when the user touches the share button 74, the application 14b displays an application list screen 77, in which names (one example of application information) of applications capable of being designated as the data output destination application 64 (refer to FIG. 2) are listed as options, on the LCD 18. The user selects an option corresponding to a desired application from the displayed options, thereby selecting the data output destination application 64.

Then, the application 14b converts the image data into one format of JPEG and PDF, which can be processed by the data output destination application 64, and outputs the URI of the converted image data to the OS 14a. In the meantime, the OS 14a starts the designated data output destination application 64 and sets a screen 79 of the data output destination application 64 as a foreground. Therefore, the user can continue the processing by the data output destination application 64.

Here, as described above, according to the search function of the OS 14a, the value of the TYPE that can be designated as the search condition in the one search request is only one. Therefore, if the search result of the OS 14a is used as it is, only a JPEG correspondence application list or PDF correspondence application list is displayed. To the contrary, the application 14b requests twice the search from the OS 14a so as to display the application list screen 77. Specifically, the application first requests the application search from the OS 14a with a first search condition, in which JPEG is designated as a value of the TYPE. Then, after receiving the search result thereof, the application requests the application search from the OS 14a with a second search condition, in which PDF is designated as a value of the TYPE. As a result, options for selecting any one of an application capable of processing the JPEG (hereinafter, referred to as "JPEG correspondence application)" and an application capable of processing the PDF (hereinafter, "referred to as PDF correspondence application") are displayed. Specifically, first application information 81 indicating the JPEG correspondence applications and second application information 82 indicating the PDF correspondence applications are displayed as the options. That is, it is possible to present the JPEG correspondence applications and the PDF correspondence applications to the user. Accordingly, it is possible to display the application list screen 77 that is convenient for the user to select the data output destination application 64. Meanwhile, in the below descriptions, the first application information 81 and the second application information 82 are collectively referred to as the application information when it is not necessary to particularly distinguish them.

Figure 4B:
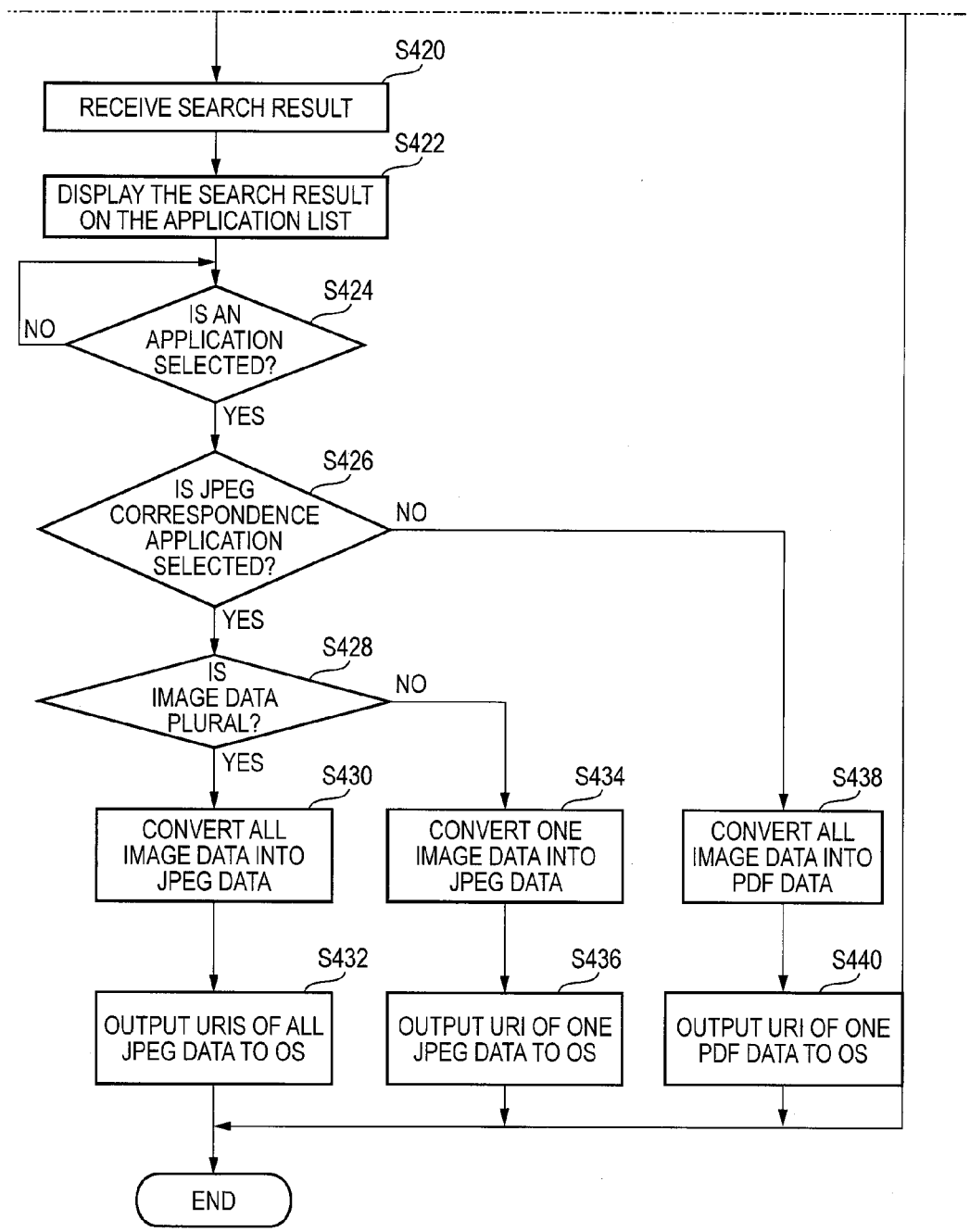
FIG. 4 is a flowchart illustrating scan processing according to a first illustrative embodiment.

FIG. 4 is a flowchart illustrating scan processing that is performed by the CPU 11 of the mobile terminal 10 in accordance with the application 14b. This processing starts when the user instructs execution of the scan from an operation receiving screen (not shown) of the application 14b. Meanwhile, in the below descriptions, the application 14b control the CPU 11 to perform respective steps shown in flowcharts of first to fourth illustrative embodiments and a modified embodiment described with reference to FIGS. 4 to 11, or the application 14b control the CPU 11 to perform the same by using the functions of the OS 14a and the like. In the meantime, the steps of the respective flowcharts may be partially replaced with steps that are performed by the OS 14a and other applications with controlling the CPU 11. Also, the steps may be partially replaced with steps that are implemented as a hardware equipped in the mobile terminal 2, irrespective of CPU 11.

First, in step S400 (hereinafter, the term 'step' is omitted), the CPU 11 transmits a scan instruction to the device 30. While the scan operation is not completed in the device 30 (S400: No), the CPU 11 does not proceed to a next step.

When the scan operation is completed (S402: Yes), the CPU 11 acquires image data from the device 30, which is generated by reading an image in the device 30, and temporarily stores the same in the RAM 13 (S403). In this illustrative embodiment, it is assumed that the image data is uncompressed or reversibly compressed RAW image data. Subsequently, the CPU 11 displays the scan result confirmation screen 70 (refer to FIG. 3) on the LCD 18 (S404). When an execution instruction other than the share function is input in the scan result confirmation screen 70 (S406: No), the CPU 11 performs processing corresponding to the instruction (S408) and ends this processing.

On the other hand, when the user touches the share button 74 (refer to FIG. 3) in the scan result confirmation screen 70 and when an instruction to perform the share function is input (S406: Yes), the CPU 11 determines whether the image data acquired in S403 is plural or not (S410). When it is determined that the image data is single (S410: No), the CPU 11 requests an application search from the OS 14a with the first search condition, in which JPEG is designated as a value of the TYPE and SEND, which is ACTION corresponding to data transmission, is designated as a value of the ACTION (S412). Then, the CPU receives application information of an application satisfying the first search condition (hereinafter, referred to as single JPEG correspondence application) from the OS 14a, as a search result (S416). Then, the CPU 11 requests an application search from the OS 14a with the second search condition, in which PDF is designated as a value of the TYPE (S418). Then, the CPU receives application information of an application satisfying the second search condition (hereinafter, referred to as PDF correspondence application) from the OS 14a, as a search result (S420).

Subsequently, the CPU 11 displays the application list screen 77 having the application information received in S416 and the second application information received in S420 included therein on the LCD 18. Thereby, the CPU 11 control the touch panel 17 to receive an operation of selecting one of the application information (S422).

On the other hand, when it is determined that the image data acquired in S403 is plural (S410: Yes), the CPU 11 designates JPEG as a value of the TYPE and MULTI_SEND as a value of the ACTION, and the CPU 11 requests the application search from the OS 14a (S414). Here, MULTI_SEND is a value that is declared by an application capable of executing processing of transmitting a plurality of data. Therefore, in S416, the CPU can acquire application information of a JPEG correspondence application (hereinafter, referred to as plural JPEG correspondence application) capable of processing the plurality of image data by executing the processing of S414 instead of S412. Then, in S422, the application list screen 77, in which the application information of the plural JPEG correspondence application and the application information of the PDF correspondence application are included, is displayed (S422).

Subsequently, while the application information displayed in the application list screen 77 is not selected (S424: No), the CPU 11 does not proceed to a next step. On the other hand, when the application information displayed in the application list screen 77 is selected (S424: Yes) and an operation of selecting the application information of the single JPEG correspondence application or plural JPEG correspondence application is received (S426: Yes), the CPU 11 determines whether the image data acquired in S403 is plural or not (S428).

When the image data is plural (S428: Yes), the CPU 11 converts the plurality of image data acquired from the device 30 into JPEG data, respectively, and stores the same in the memory card 20 (S430). Then, the CPU 11 designates an application (hereinafter, referred to as selected application) corresponding to the selected application information as the data output destination application 64, outputs the URIs, TYPEs and ACTIONs of the JPEG data to the OS 14a, and requests the execution of the share function from the OS 14a (S432), and this processing ends.

Also, when the image data is single (S428: No), the CPU 11 converts the single image data acquired from the device 30 into JPEG data and stores the same in the memory card 20 (S434). Then, the CPU 11 designates an selected application, outputs the URI, TYPE and ACTION of the single JPEG data to the OS 14a, and requests the execution of the share function from the OS 14a (S436), and this processing ends.

Also, when the operation of selecting the application information of the PDF correspondence application is received (S426: No), the CPU 11 converts the image data acquired from the device 30 into PDF data and stores the same in the memory card 20 (S438). Incidentally, when the plurality of image data is acquired, the CPU converts the plurality of image data into one PDF file in which the plurality of image data is stored in one file. Then, the CPU designates a selected application, outputs the URI and the like of the PDF data to the OS 14a, and requests the execution of the share function from the OS 14a (S440), and this processing ends.

According to the scan processing of the first illustrative embodiment, since the options for receiving the operation of selecting any one of the JPEG correspondence information satisfying the first search condition and the PDF correspondence application satisfying the second search condition are displayed in the application list screen 77, it is possible to display the application list screen 77 that is convenient for the user to select the data output destination application 64.

Also, it is possible to convert the image data, which is generated by reading the image in the device 30, into the processable data format of the data output destination application 64 and to output the URI thereof to the data output destination application 64.

Also, since the image data acquired from the device 30 is converted into the data format corresponding to the selected application, it is possible to convert the image data into the data format appropriate for the data output destination application 64 even though the user does not remember the data format that can by processed by the selected application.

Figure 5B:
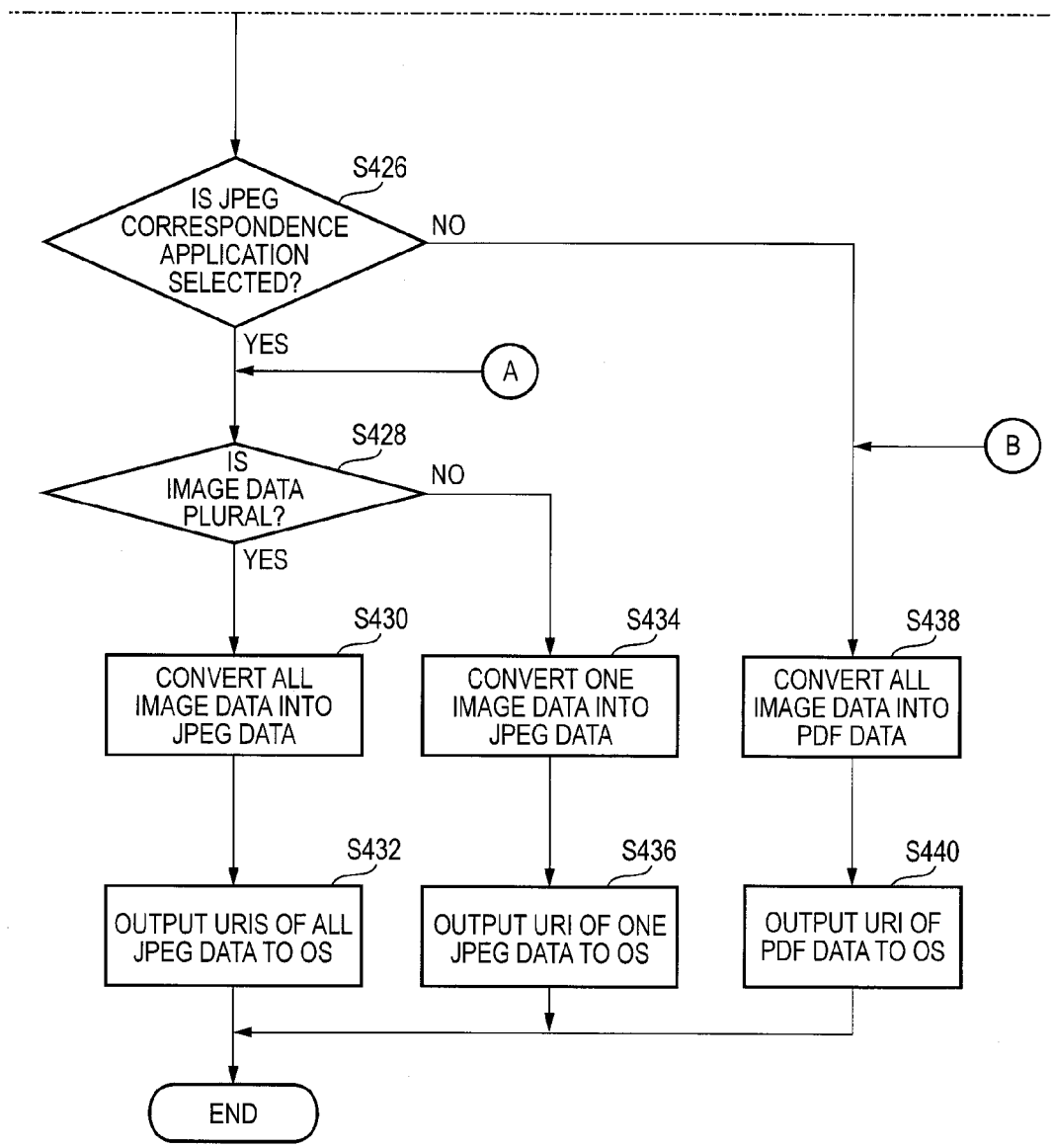
FIG. 5 is a flowchart illustrating scan processing according to a second illustrative embodiment.

FIG. 5 is a flowchart illustrating scan processing that is performed by the CPU 11 in accordance with the application 14b of a second illustrative embodiment. Regarding the steps S400 to S422 included in the scan processing of the second illustrative embodiment, which are the same as those of the scan processing of the first illustrative embodiment, the illustrations and descriptions thereof will be omitted.

The scan processing of the second illustrative embodiment is different from the scan processing of the first illustrative embodiment in processing after the user selects the application information in the application list screen 77 (S424: Yes).

Specifically, the CPU 11 first determines the processable data format by the selected application (S502). When the selected application can process only the JPEG or PDF (S504: No), the CPU 11 proceeds to S426, designates the selected application and requests the execution of the share function from the OS 14a. In the meantime, since the processing after the CPU proceeds to S426 is the same as those of the scan processing of the first illustrative embodiment, the same reference numerals are used and the descriptions thereof will be omitted.

On the other hand, when the selected application is not only the JPEG correspondence application but also the PDF correspondence application (S504: Yes), i.e., when the application information corresponding to the selected application is included in both the first application information 81 satisfying the first search condition and the second application information 82 satisfying the second search condition, the CPU 11 displays a data format selection screen 83 on the LCD 18 and controls the touch panel 17 to receive an operation of selecting one of JPEG and PDF (S506).

FIG. 6 illustrates an example of the data format selection screen 83 that is displayed on the LCD 18 when the user selects the selected application, based on the application list screen 77. As shown in FIG. 6, the data format selection screen 83 may be a screen that is configured to make the user select a desired data format from the data formats that can be processed by the selected application. In this illustrative embodiment, JPEG and PDF may be selected as the data format. Also, a message display area for inquiry may be provided in a part of the application list screen 77, instead of the data format selection screen 83, to make the user select the data format in the message display area.

Returning to FIG. 5, while the data format is not selected (S508: No), the CPU 11 does not proceed to a next step. On the other hand, when the data format is selected (S508: Yes), the CPU 11 specifies the data format received through the touch panel 17 (i.e., data format selected by the user on the data format selection screen 83) (S510). When the JPEG is specified (S512: Yes), the CPU 11 proceeds to S428, converts the image data into JPEG data (S430 or S434), and outputs the URI of the JPEG data to the OS 14a (S432 or S436).

On the other hand, when the PDF is specified as the data format selected by the user (S512: No), the CPU 11 proceeds to S438, converts the image data into PDF data (S438), and outputs the URI of the PDF data to the OS 14a (S440).

According to the scan processing of the second illustrative embodiment, when the selected application is the JPEG correspondence application and the PDF correspondence application, it is possible to make the user select one of JPEG and PDF. Therefore, even though the user does not remember what the data format of the image data the selected application can process, the user can perform the appropriate operation, so that the convenience is improved.

Figure 7A:
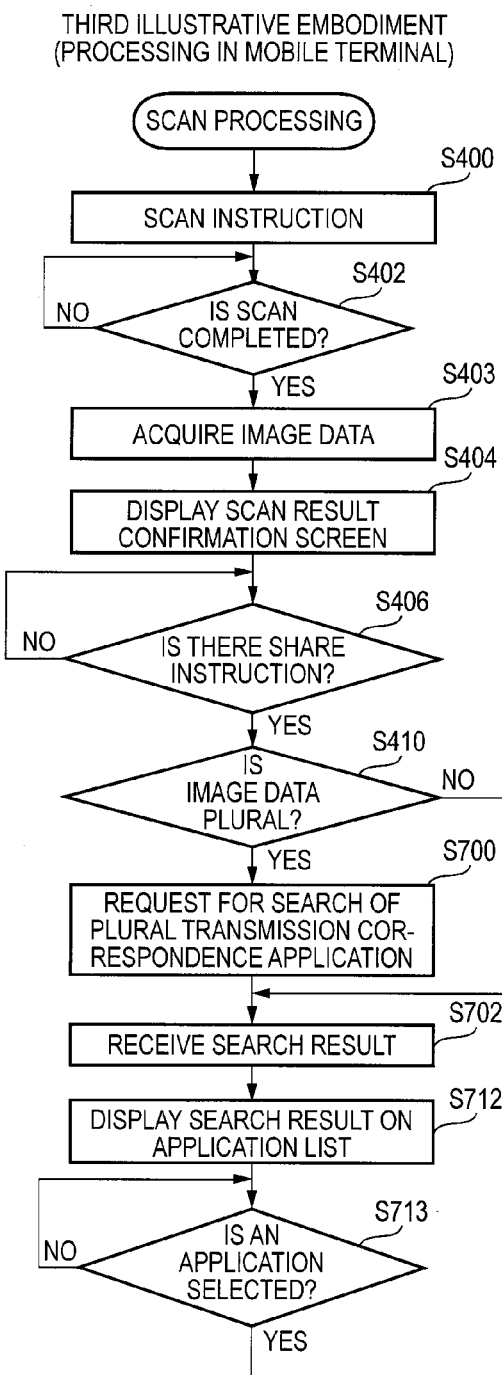
FIG. 7 is a flowchart illustrating scan processing according to a third illustrative embodiment.
Figure 7B:
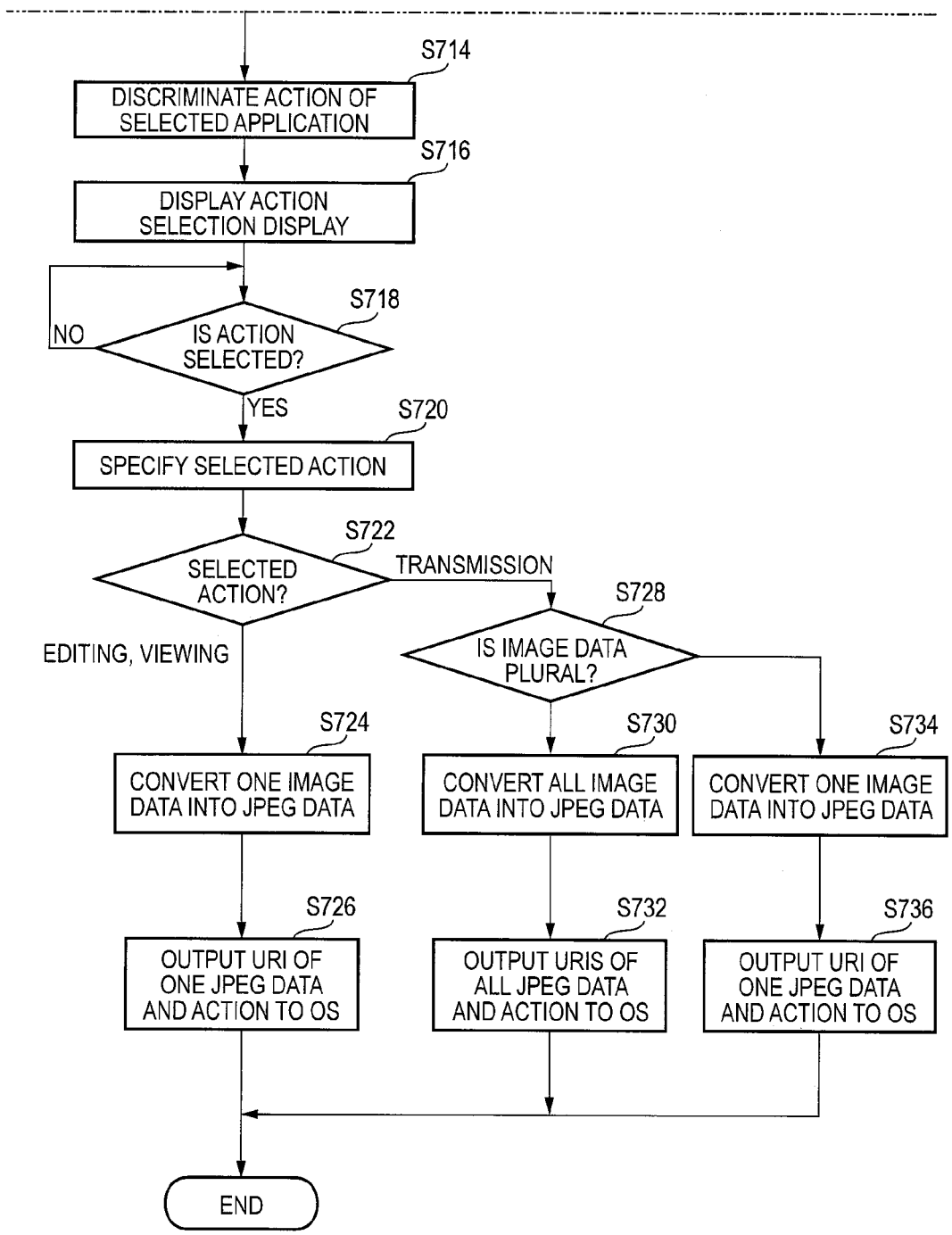

FIG. 7 is a flowchart illustrating scan processing of a third illustrative embodiment. Regarding the steps included in the scan processing of the third illustrative embodiment, which are the same as those of the scan processing of the first illustrative embodiment (refer to FIG. 4), the same reference numerals are used, and the descriptions thereof will be omitted. Also, in the third illustrative embodiment, it is assumed that the user has previously selected the JPEG as the data format.

In the scan processing of the first illustrative embodiment, the values of the TYPE are different between the first search condition and the second search condition. In contrast, in the third illustrative embodiment, the values of the ACTION are different between the first search condition and the second search condition. In the below, this will be described in detail.

First, when it is determined that the acquired image data is plural (S410: Yes), the CPU 11 requests the application search from the OS 14a with a search condition, in which MULTI_SEND is designated as a value of the ACTION and JPEG is designated as a value of the TYPE (S700). The application declaring MULTI_SEND is referred to as a plural transmission correspondence application. The CPU 11 receives application information of an application that is the JPEG correspondence application and the plural transmission correspondence application from the OS 14a, as the search result (S702). Then, the CPU 11 displays an application list screen 84 (which will be described later with reference to FIG. 8) having the application information included therein on the LCD 18 and control the touch panel 17 to receive an operation of selecting one of the applications satisfying the condition (S712). That is, when the acquired image data is plural, it is possible to make the user select any one of appropriate applications capable of processing the plurality of image data.

On the other hand, when it is determined that the acquired image data is single (S410: No), the CPU 11 requests the application search from the OS 14a more than once. Specifically, the CPU requests the application search from the OS 14a with a first search condition, in which SEND is designated as a value of the ACTION and JPEG is designated as a value of the TYPE (S704). Then, the CPU receives application information of an application satisfying the first search condition (hereinafter, referred to as a single transmission correspondence application) from the OS 14a, as the search result (S706).

Then, the CPU 11 requests the application search from the OS 14a with a second condition, in which EDIT, which is ACTION corresponding to editing, is designated as a value of the ACTION and JPEG is designated as a value of the TYPE (S708). Then, the CPU 11 receives application information of an application satisfying the second search condition (hereinafter, referred to as an editing correspondence application) from the OS 14a, as the search result (S710).

Then, the CPU 11 requests the application search from the OS 14a with a third condition, in which VIEW, which is ACTION corresponding to display process, is designated as a value of the ACTION and JPEG is designated as a value of the TYPE (S711). Then, the CPU receives application information of an application satisfying the third search condition (hereinafter, referred to as a viewing correspondence application) from the OS 14a, as the search result (S702).

Then, the CPU 11 displays the application list screen 84 (refer to FIG. 8), in which the application information of the three TYPEs received based on the search requests of three times is included, on the LCD 18 and controls the touch panel 17 to receive an operation of selecting any one (S712). As a result, it is possible to display the application information of the application, which is the JPEG correspondence application and corresponds to at least one of the single transmission correspondence application, the editing correspondence application and the viewing correspondence application, in the application list screen 84. Accordingly, it is possible to present many options to the user.

Then, while any one application information is not selected in the application list screen 84 (S713: No), the CPU 11 does not proceed to a next step. On the other hand, when the application information is selected (S713: Yes), the CPU 11 discriminates the ACTIONs that are declared by the selected application (S714). Then, the CPU 11 displays an action selection screen on the LCD 18 and controls the touch panel 17 to receive an operation of selecting any one of the ACTIONs declared by the selected application (i.e., processing that can be performed by the selected application) (S716).

Figure 8:
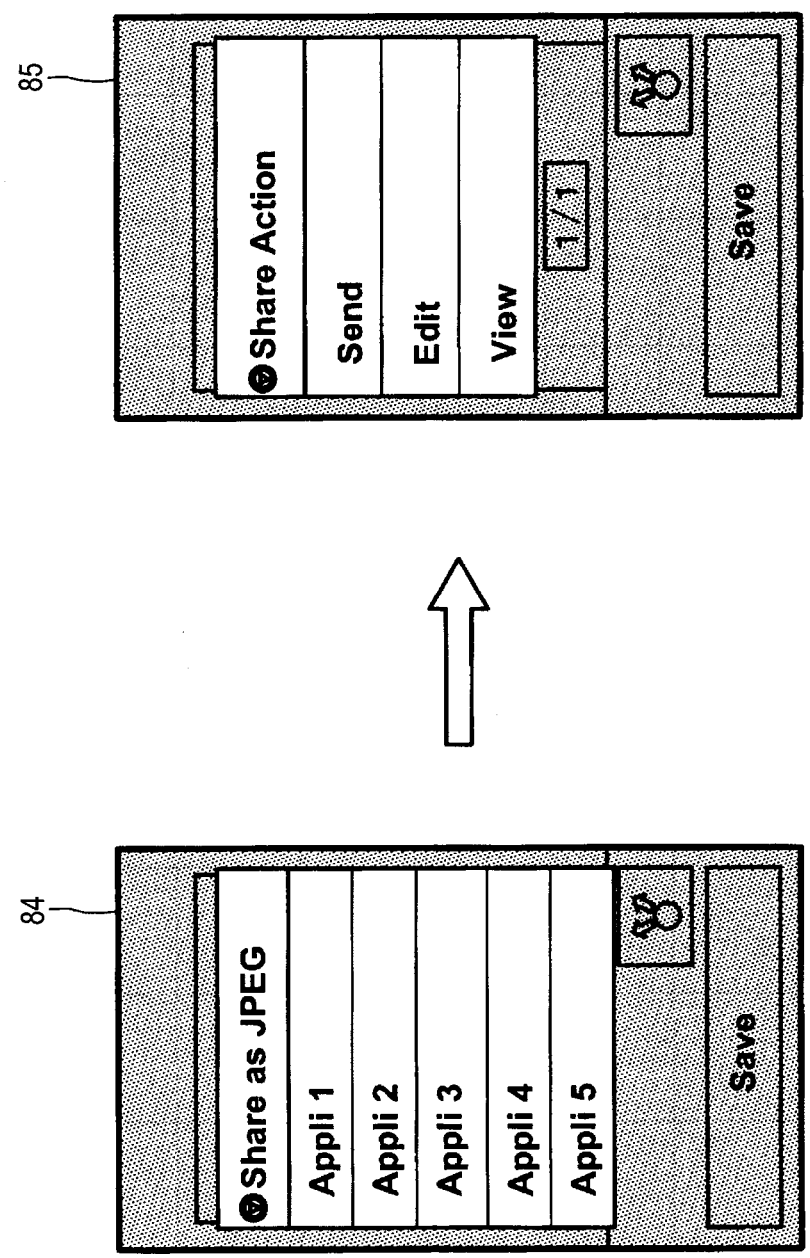
FIG. 8 illustrates a screen transition in the third illustrative embodiment.

FIG. 8 shows an example of an action selection screen 85. The action selection screen 85 is configured so that the user can select a desired ACTION from the ACTIONs declared by the selected application. Here, both SEND and MULTI_SEND of the ACTIONs indicate transmission processing. Accordingly, in the third illustrative embodiment, the application declaring MULTI_SEND is simply displayed as SEND in the options of the action selection screen 85. In the meantime, a message display area for inquiry may be provided in a part of the application list screen 84, instead of the action selection screen 85, and the user may select the ACTION in the message display area. Also, although not shown, when the selected application declares only one ACTION, the CPU may perform the processing after S426 shown in the scan processing of the first illustrative embodiment (refer to FIG. 4) without executing the display processing (S716) of the action selection screen 85.

Returning to FIG. 7, while the ACTION is not selected (S718: No), the CPU 11 does not proceed to a next step. On the other hand, when the ACTION is selected (S718: Yes), the CPU 11 specifies the ACTION received through the touch panel 17 (S720). When the ACTION selected by the user is EDIT or VIEW (S722: EDITING, VIEWING), the CPU 11 converts one image data into JPEG data (S724). Here, the one image data is the image data that corresponds to the scan image 71 displayed on the scan result confirmation screen 70. Then, the CPU 11 outputs the URI of the JPEG data and the ACTION selected by the user to the OS 14a (S726), and the processing ends.

When the ACTION selected by the user is SEND (S722: TRANSMISSION), the CPU determines whether a plurality of image data is acquired from the device 30 (S728). When the plurality of image data is acquired (S728: Yes), the CPU 11 converts the plurality of image data into JPEG data, respectively (S730). Then, the CPU 11 outputs the URIs of all the JPEG data obtained by the conversion and the ACTION selected by the user to the OS 14a (S732), and the processing ends.

On the other hand, when the ACTION selected by the user is SEND (S722: transmission) and single image data is acquired from the device 30 (S728: No), the CPU 11 converts the image data into JPEG data (S734), outputs the URI of the JPEG data and the ACTION selected by the user to the OS 14a (S736), and the processing ends.

According to the scan processing of the third illustrative embodiment, when the image data is single, the application information of the single transmission correspondence application, the editing correspondence application and the viewing correspondence application is displayed. Therefore, it is possible to display the application list screen 84 that is convenient for the user to select the data output destination application 64.

Also, since the application information of the application, which can process the data format (JPEG in the example of FIG. 7) previously selected by the user, is displayed, the convenience is more high when the user determines the data format in advance. Also, it is possible to convert the image data, which is acquired from the device 30, into the data format previously selected by the user and to enable the data output destination application 64 to acquire the same.

Figure 9A:
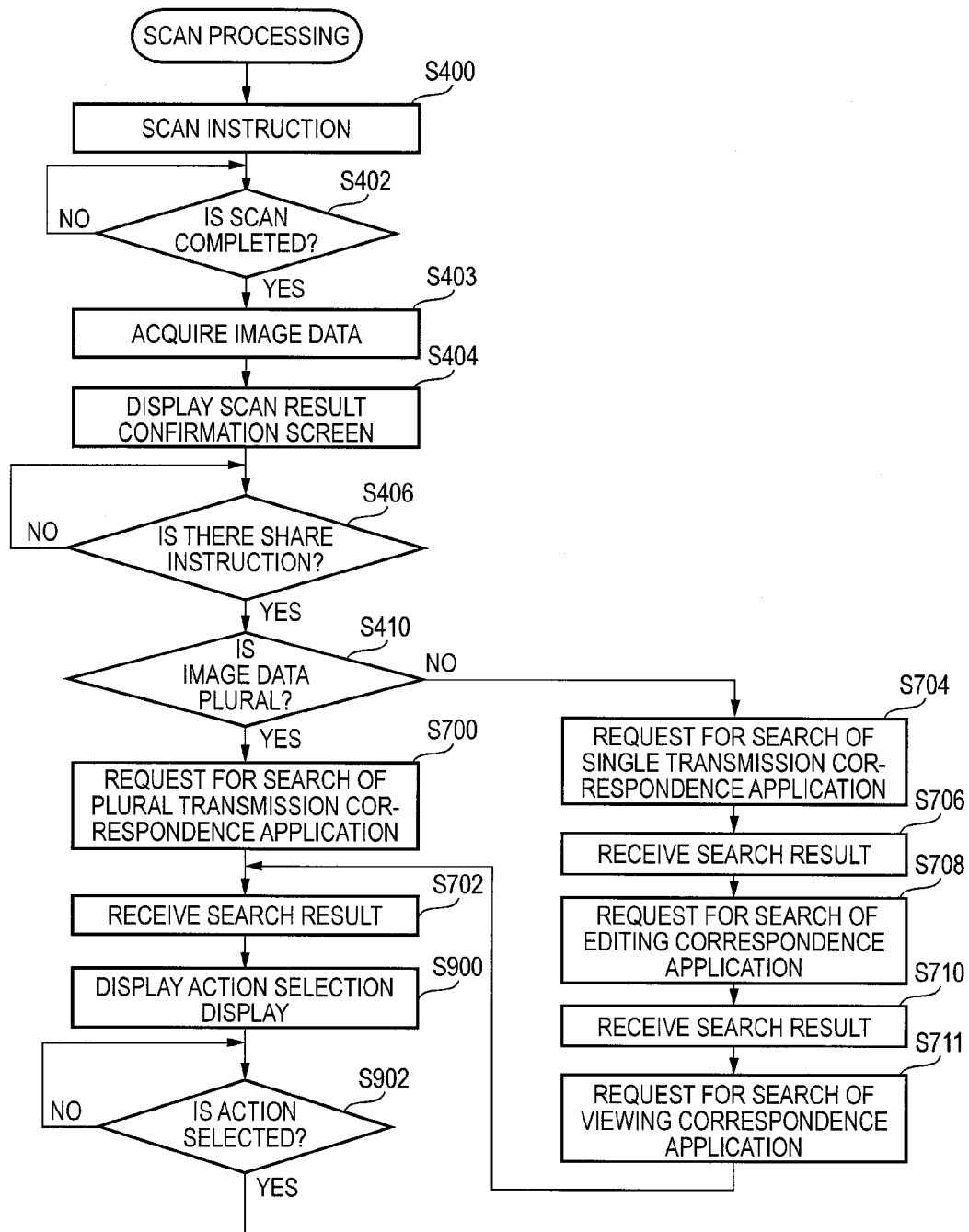
FIG. 9 is a flowchart illustrating scan processing according to a fourth illustrative embodiment.
Figure 9B:
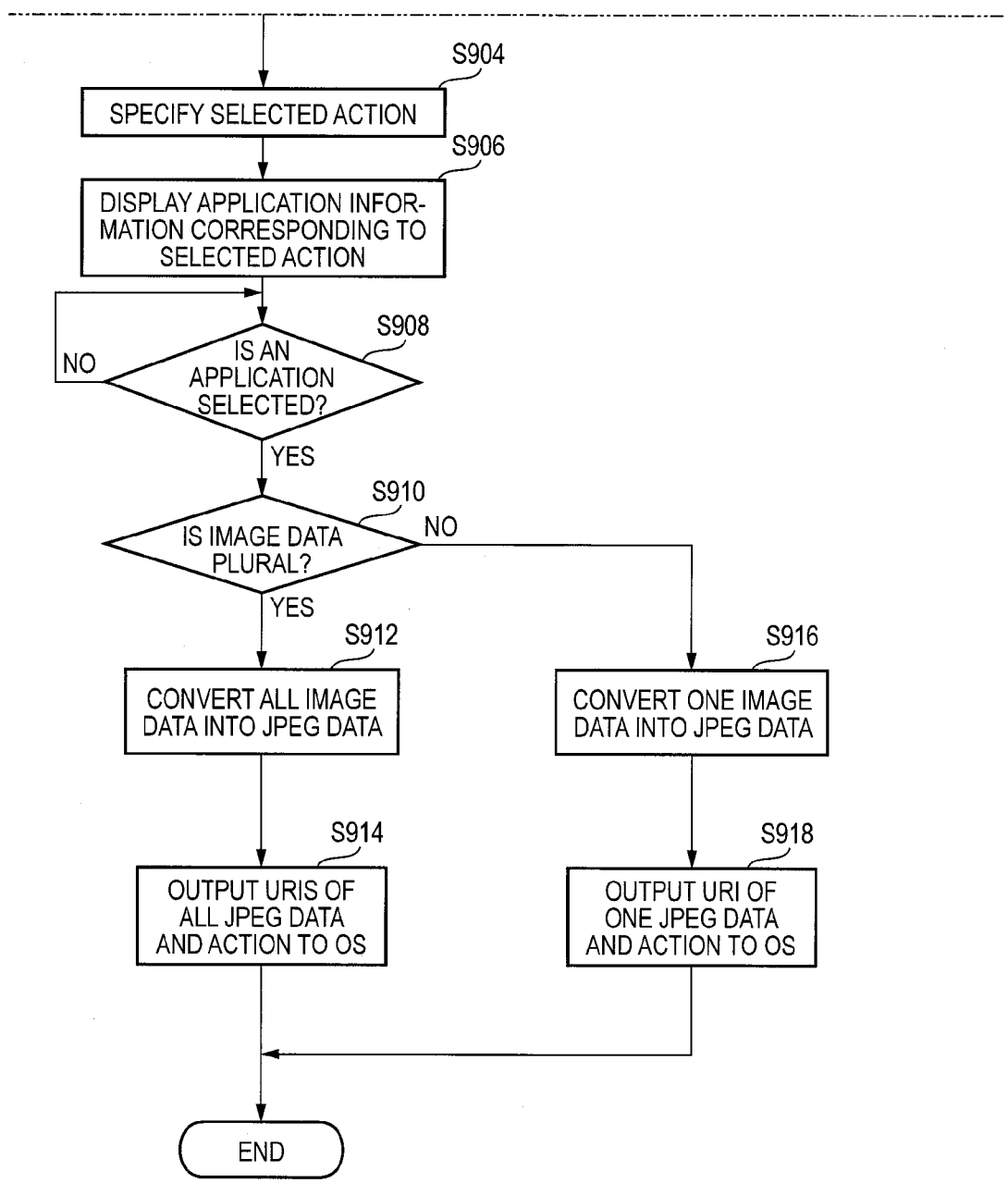

FIG. 9 is a flowchart illustrating scan processing of a fourth illustrative embodiment. Regarding the steps included in the scan processing of the fourth illustrative embodiment, which are the same as those of the scan processing of the first illustrative embodiment (refer to FIG. 4) or third illustrative embodiment (refer to FIG. 7), the same reference numerals are used, and the descriptions thereof will be omitted. Also, in the fourth illustrative embodiment, it is assumed that the user has selected the JPEG in advance, as the data format.

The scan processing of the fourth illustrative embodiment is the same as the third illustrative embodiment up to the step (S702) of receiving the search result from the OS 14a. However, in the scan processing of the third illustrative embodiment, the user selects the data output destination application 64 and then selects the ACTION. To the contrary, in the scan processing of the fourth illustrative embodiment, the user selects the ACTION and then selects the data output destination application 64.

Specifically, the CPU first displays the action selection screen 85 (refer to FIG. 10) on the LCD 18 and controls the touch panel 17 to receive an operation of selecting an ACTION (S900). Similarly, to the third illustrative embodiment, a message display area for inquiry may be provided in a part of the LCD 18, instead of the action selection screen 85, and the user may select an ACTION in the message display area. While an ACTION is not selected on the action selection screen 85 (S902: No), the CPU 11 does not proceed to a next step.

When an ACTION is selected (S902: Yes), the CPU 11 specifies the ACTION received through the tough panel 17 (i.e., ACTION selected by the user on the action selection screen 85)

Figure 10:
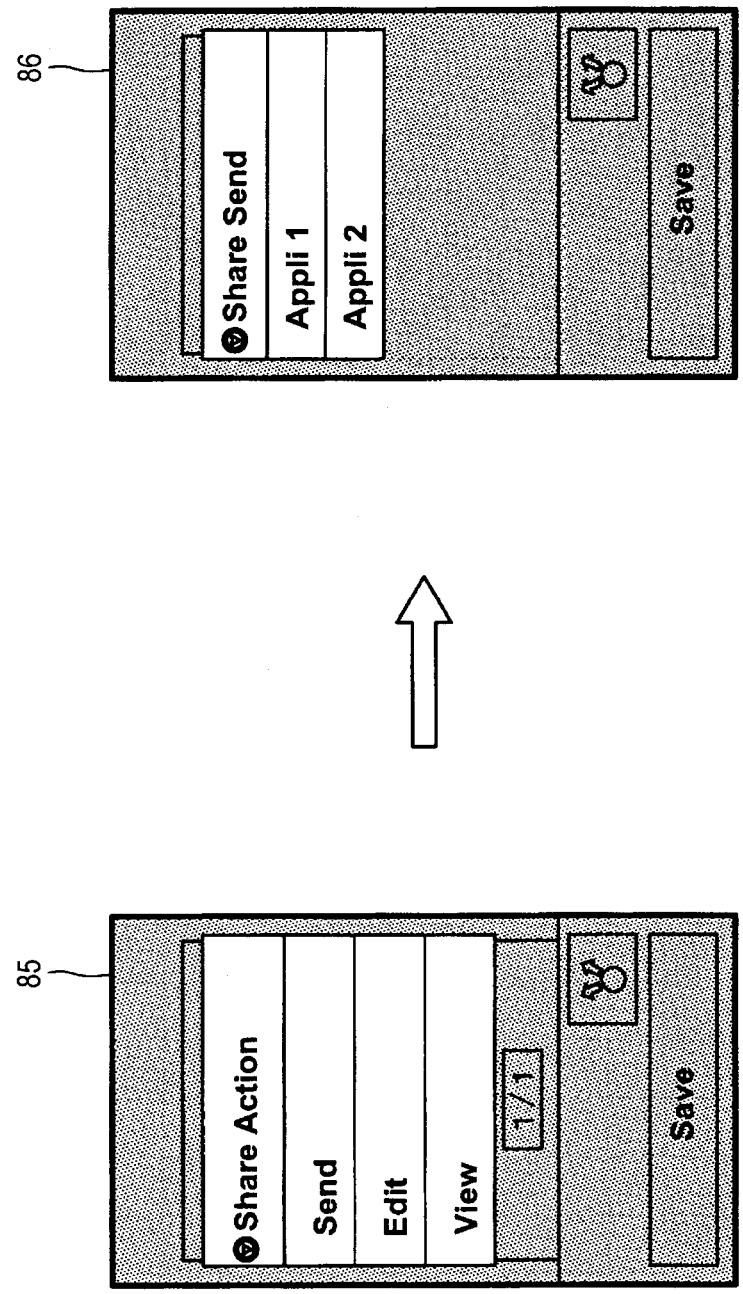
FIG. 10 illustrates a screen transition in the fourth illustrative embodiment.

Then, the CPU 11 displays only application information of the application corresponding to the ACTION specified in S904, among the application information received from the OS 14a, in the application list screen 86 (S906). For example, FIG. 10 shows an example of the application list screen 86 that is displayed on the LCD 18 when SEND of the ACTIONs shown on the action selection screen 85 is selected. In this case, only the application information of the applications declaring SEND is displayed in the application list screen 86.

Returning to FIG. 9, while no application information is selected in the application list screen 86 (S908: No), the CPU 11 does not proceed to a next step. When any one application information is selected (S908: Yes), the CPU 11 determines whether a plurality of image data is acquired from the device 30 (S910). When a plurality of image data is acquired (S910: Yes), the CPU 11 converts the plurality of image data into JPEG data, respectively (S912). Then, the CPU 11 outputs the URIs of all the JPEG data obtained by the conversion and the ACTION selected by the user to the OS 14a (S914), and the processing ends.

When the single image data is obtained from the device 30 (S910: No), the CPU 11 converts the image data into JPEG data and outputs the URI of the JPEG data and the ACTION selected by the user to the OS 14a (S918), and the processing ends.

According to the fourth illustrative embodiment, even though the user does not remember the processing that can be performed by each application, the user can select the data output destination application 64 from the applications corresponding to the desired ACTION.

The mobile terminal 10 is an example of the information processing apparatus. The CPU 11 is an example of the computer, the search unit and the data share unit. The LCD 18 is an example of the display unit. The touch panel 17 is an example of the operation unit. The data output destination application 64 is an example of the data output destination application. The first search condition is an example of the first condition. The second search condition is an example of the second condition. The URI is an example of the location indicating information. The JPEG is an example of the first data format, and the PDF is an example of the second data format. The device 30 is an example of the reading apparatus. The TYPE of the first and second illustrative embodiments and the ACTION of the third and fourth illustrative embodiments are an example of first setting item, respectively.

Each unit of the search unit, the data share unit, the display unit and the operation unit may be configured a single hardware or a hardware that is operated in response to the program of this disclosure or program except for this disclosure such as operating system. Also, the respective units may be a hardware that is operated by a combination of processing by a plurality of programs.

The CPU 11 that performs S412, S414 and S704 is an example of the first request control unit. The CPU 11 that performs S416 and S706 is an example of the first reception unit. The CPU 11 that performs S418, S708, and S711 is an example of the second request control unit. The CPU 11 that performs S420, S702 and S710 is an example of the second reception unit. The CPU 11 that performs S422, S712 and S906 is an example of the display control unit. The CPU 11 that performs S403 is an example of the acquisition unit. The CPU 11 that performs S432, S436, S440, S726, S732, S736, S914 and S918 is an example of the output unit. The CPU 11 that performs S430, S434 and S438 of FIG. 4 is an example of the first conversion control unit. The CPU 11 that performs S506 is an example of the format selection reception control unit. The CPU 11 that performs S410 of FIGS. 7 and 9 is an example of the first determination unit. The CPU 11 that performs S724, S730, S734, S912 and S916 is an example of the second conversion control unit. The CPU 11 that performs S900 is an example of the processing selection reception control unit.

The CPU 11 that performs S412, S414 and S704 is an example of the first request unit. The CPU 11 that performs S418, S708 and S711 is an example of the second request unit. The CPU 11 that performs S422, S712 and S906 is an example of the display unit.

Although this disclosure has been described with reference to the illustrative embodiments, this disclosure is not limited to the illustrative embodiments. A variety of improvements can be made without departing from the gist of this disclosure.

For example, in the above illustrative embodiments, the mobile terminal 10 having the communication function is an example of the information processing apparatus. However, a variety of apparatuses having no communication function such as personal computer, digital camera and the like may be an example of the information processing apparatus. Also, this disclosure can be applied to an apparatus that has hard keys with which an operation is input and does not have the touch panel 17.

Also, in the above illustrative embodiments, an example of the first data format is JPEG and an example of the second data format is PDF. However, this disclosure is not limited thereto. For example, a variety of data formats such as PNG, GIF, BMP and so on may be an example of the first data format. Also, a variety of data formats such as DOC, XLS and so on may be an example of the second data format.

Also, in the above illustrative embodiments, the JPEG data and the PDF data are stored in the memory card 20 that is detachably mounted to the mobile terminal 10. However, the data may be stored in the flash memory 14 that is embedded in the mobile terminal 10.

Also, in the above illustrative embodiments, the scanner data has been exemplified as the image data. However, the image data is not limited thereto and may be image data that is captured by a digital camera embedded in the mobile terminal 10. Also, the image data may be data that is generated by reducing or enlarging image data, which is acquired from the device, to the size of the scan image 71 displayed on the LCD 18. Also, when the image data acquired from the device 30 is converted into predetermined data format in the mobile terminal 10 so as to display the scan image 71 on the LCD 18, data that has been converted into the predetermined data format may be an example of the image data.

Also, in the above illustrative embodiments, the image data is the RAW image data. However, even when JPEG data is acquired as the image data from the device 30, this disclosure can be applied. In this case, when the user selects the JPEG correspondence application, the processing of changing the format of the image data is not necessary, so that it is possible to skip over the steps of S430, S434, S724, S730, S734, S912 and S916.

In the above illustrative embodiments, the application 14b requests the search from the OS 14a more than once.

However, when the sufficient number of applications is found by one search, the search request may be limited to one time.

Figure 11:
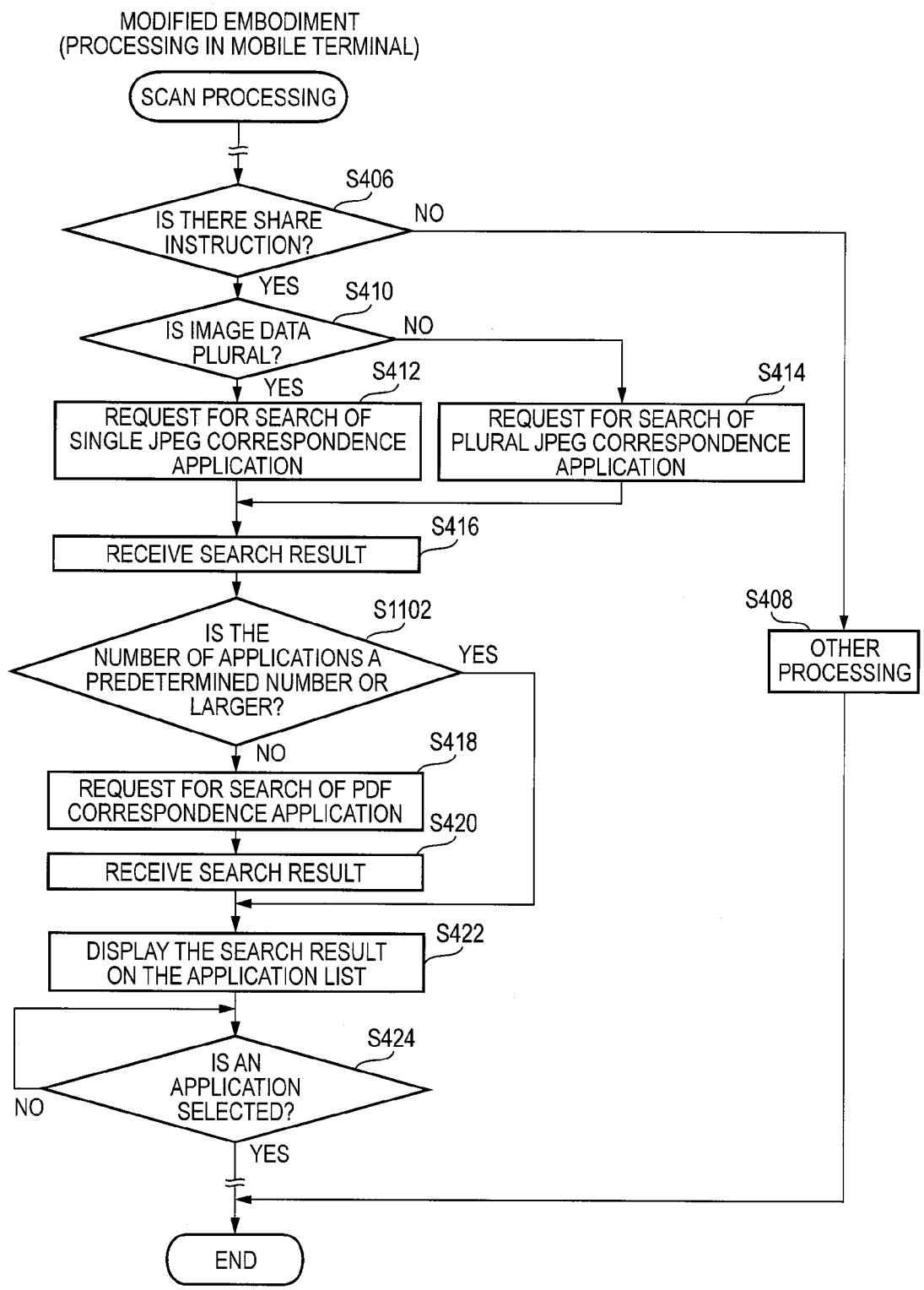
FIG. 11 is a flowchart illustrating scan processing according to a modified embodiment.

FIG. 11 is a flowchart illustrating scan processing of a modified embodiment. In the meantime, although the scan processing of the modified embodiment includes the same steps as S400 to S404 and S426 to S440 of the scan processing (refer to FIG. 4) of the first illustrative embodiment, the corresponding steps are not shown.

As shown in FIG. 11, in the scan processing of the modified embodiment, a step of S1102 is provided between the step of receiving the first search result (S416) and the step of requesting the second search (S418).

Specifically, the CPU determines whether the number of applications corresponding to the application information received in S416 is a predetermined number (for example, 10) or larger (S1102). When the number of applications is smaller than the predetermined number (S1102: No), the CPU 11 requests the application search from the OS 14a with the second search condition (S418) and receives application information of the applications satisfying the second search condition from the OS 14a, as the search result (S420). Then, the CPU 11 displays the application list screen 77 (refer to FIG. 3), in which the first application information 81 received in S416 and the second application information 82 received in S420 are included as options, on the LCD 18 (S422).

On the other hand, when the number of applications corresponding to the application information received in S416 is the predetermined number or larger (S1102: Yes), the CPU 11 skips over the steps of S418 and S420. That is, the CPU does not request for search with the second condition. In this case, the first application information 81 is displayed in the application list screen 77 as the option and the second application information is not displayed.

According to this modified embodiment, when the number of applications satisfying the first search condition is the predetermined number or larger, the request for search of the application satisfying the second search condition is not performed. Therefore, it is possible to present the predetermined number of the applications or larger to the user while reducing the load to be applied to the mobile terminal 2. In this modified embodiment, the CPU 11 that performs S1102 corresponds to an example of the second determination unit.

Figure 12B:
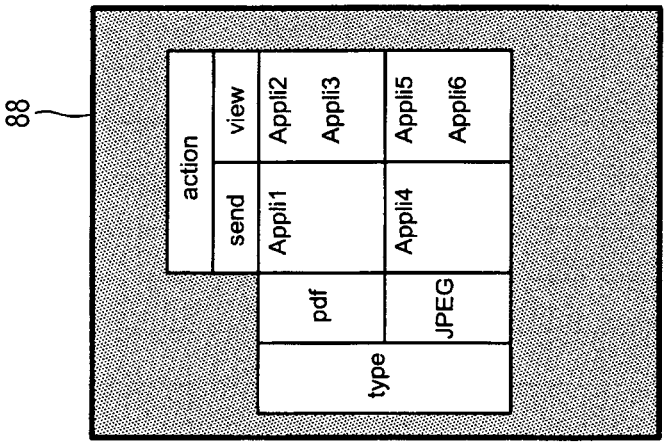
FIGS. 12A and 12B illustrate application list screens of modified embodiments.
Figure 12A:
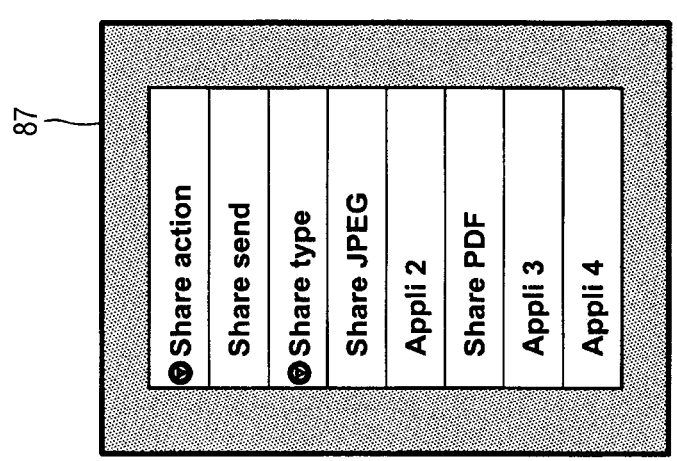

FIGS. 12A and 12B illustrate application list screens of modified embodiments. FIG. 12A illustrates an application list screen 87 of a first modified embodiment. The application list screen 87 divides and displays application names of applications declaring SEND into the JPEG correspondence application and the PDF correspondence application. FIG. 12B illustrates an application list screen 88 of a second modified embodiment. The application list screen 88 displays the applications in a matrix shape in which a horizontal direction is divided for each ACTION and a vertical direction is divided for each TYPE.

That is, the application list screens 87, 88 shown in FIGS. 12A and 12B can display the options (for example, application names) in association with the ACTIONs that can be performed by the respective applications and the data formats that can be processed. Accordingly, when any one of the application list screens 87, 88 is adopted, the user can select an appropriate application by referring to the ACTIONs and the data formats.

Also, in the above illustrative embodiments, the OS 14a is the ANDROID OS. However, this disclosure can be also applied to an information processing apparatus having other OS installed therein.

Also, in the above illustrative embodiments, the search and share functions are implemented by the OS 14a. However, this disclosure can be also applied to a case where Also, in the above illustrative embodiments, the mobile terminal 10 and the device 30 are Wi-Fi connected. However, this disclosure can be also applied to a case where the mobile terminal and the device are connected by Bluetooth (registered trademark). the search and share functions are implemented by hardware or middleware.

Also, in the above illustrative embodiments, the name of the application corresponds to an example of the application information. However, the application information may be the other information such as icon image and the like indicating each application. Also, the application information may include both the name of the application and the icon image.

Also, in the above illustrative embodiments, the application information received from the OS 14a that is an example of the search unit is displayed as the options of the application list screen. Instead of this, when an application ID is received from the search unit, as the application information, the name of the application or icon image may be further acquired from the application information by the API and the information acquired based on the application information may be displayed as the options.

Also, in the above illustrative embodiments, the application 14b converts the image data acquired from the device 30 into any one of the two data formats. However, this disclosure can be also applied to a case where the image data is converted into any one of the three or more data formats.

Also, like the step of the third illustrative embodiment in which it is determined that the image data is single (S410: No), the application 14b may request the search from the OS 14a three or more times and display results thereof.

Also, after requesting the search from the OS 14a a predetermined number of times (for example, two times), a user may be inquired about whether or not to perform the additional search and the user requests a new search, it may be possible to request the new search from the OS 14a with a condition (for example, search condition corresponding to an advanced function for an advance user) different from that of the search that has been already performed.

Also, another illustrative embodiment in which the characteristics of the first to fourth illustrative embodiments are appropriately combined may be adopted. Also, one mobile terminal 10 may be configured to perform the respective scan processing of the first to fourth illustrative embodiments. In this case, the user may select which scan processing is performed.

Also, in the first and second illustrative embodiments, the first application information 81 received based on the first search condition and the second application information 82 received based on the second search condition are displayed with being included in the application list screen 77. However, the above illustrative embodiments may be modified so that it is possible to switch which information will be displayed by a tab. Also, the first application information 81 and the second application information 82 are divided and displayed in the application list screen 77 shown in FIG. 3. However, the first application information and the second application information may be merged and be displayed. Also, the application information is displayed for each data format in the application list screen 77 shown in FIG. 3. However, the application information may be displayed for each action.

Also, the program for converting the image data into a predetermined data format may be provided to the application or may be a program that requests the conversion from a hardware circuit of the mobile terminal 10 or other application or OS 14*a* installed in the mobile terminal 10, and thus the data may be converted. In this case, the CPU 11 that requests the conversion of the image data from the other configurations corresponds to an example of the first conversion control unit and the second conversion control unit. Also, the first conversion control unit and the second conversion control unit may compress the image data and thus may convert the same into a compressed data format.

Also, in the above illustrative embodiments, the URI that indicates a location of the converted image data is configured by the file path. However, the URI may be information having a format (such as content format) that specifies the data with an index or ID of the application such as 'Contents://devicecontroll/attach/1'.

Also, in the first illustrative embodiment, when requesting the search of the single JPEG correspondence application from the OS 14*a* (S412), SEND is designated as a value of the ACTION. However, the other values such as 'VIEW' and 'EDIT' may be also designated.

Also, in the first illustrative embodiment, the OS 14*a* is requested to perform the search with the first search condition, in which JPEG is designated as a value of the TYPE and the second search condition, in which PDF is designated. However, it may be also possible to set the value of the TYPE with a value of the upper hierarchy. For example, 'IMAGE' may be designated as the value of the TYPE in the first search condition and 'APPLICATION' may be designated in the second search condition. When 'IMAGE' is designated, it is possible to search an application that can process a variety of images such as JPEG, BMP, GIF and the like. In the meantime, when 'APPLICATION' is designated, it is possible to search an application that can process data having a data format unique to the application such as PDF, DOC, PPT and the like.

Also, JPEG may be designated as the value of the TYPE in the first search condition, and a value (for example, BMP) that is included in an image, such as JPEG, may be designated as the value of the TYPE in the second search condition.

Also, in the scan processing (FIGS. 4 and 5) of the first and second illustrative embodiments, the step of determining whether the image data is plural (S410) and the step of requesting the search of the plural correspondence application (S414) may be omitted. In this case, the CPU makes a request for the search of the JPEG correspondence application (S412) and requests the search of the PDF correspondence application (S418), irrespective of whether the image data is plural or not. Then, the scan processing of the first and second illustrative embodiments may be modified so that when the JPEG correspondence application is selected as the data output destination application 64 (S426: Yes) and it is determined that the image data is plural (S428: Yes), the CPU 11 determines whether the JPEG correspondence application selected by the user corresponds to the plurality of image data. When the selected application corresponds to the plurality of JPEG data, the CPU 11 proceeds to S430, and the CPU 11 proceeds otherwise proceeds to S434.

Also in the scan processing (FIGS. 7 and 9) of the third and fourth illustrative embodiments, the step of determining whether the image data is plural (S410) and the step of requesting the search of the plural correspondence application (S700) may be omitted. Instead of this, the third illustrative embodiment may be modified so that when the selected ACTION is transmission (S722: TRANSMISSION) and the image data is plural (S728: Yes), the CPU 11 determines whether the selected application corresponds to the plurality of JPEG data. When the selected application corresponds to the plurality of JPEG data, the CPU proceeds to S730, and otherwise proceeds to S734.

Also, the fourth illustrative embodiment may be modified so that when the application is selected (S908: Yes) and the image data is plural (S910: Yes), the CPU determines whether the selected application correspond to the plurality of JPEG data. When the selected application corresponds to the plurality of JPEG data, the CPU proceeds to S912, and otherwise proceeds to S916.

What is claimed is:

1. A non-transitory computer-readable medium having instructions to control a computer of a mobile device, in which an operating system and a plurality of applications are installed, the mobile device including a display unit and an operation unit, the operating system of the mobile device having:

a share unit configured to perform a share function, which designates share information to a sharing designated application that is one of the plurality of applications installed on the mobile device, when the share information is designated from a sharing source application that is one of the plurality of applications installed on the mobile device, wherein the share information includes location information of data to be shared and process information representing a process type of a particular process that processes the data to be shared, wherein the particular process is a process in the sharing designated application installed on the mobile device; and a search unit configured to: search for a particular application from the plurality of applications installed on the mobile device, wherein search information is designated from the sharing source application, wherein the search information is at least one of process information and format information, the process information representing a process type and the format information representing a data format of data to be shared, the particular application is possible to function as the sharing designated application and supports at least one of the process type represented by the process information and at least one of the data format represented by the format information;

the instructions controlling the computer to execute an image data acquisition application such that the computer functions as:

an image data acquisition unit that acquires image data, in response to a user operation, a first request control unit that requests the search unit of the mobile device operating system to search for a first particular application that is installed on the mobile device with designating a first search information representing a first image format, wherein the first image format is an image format convertible from the image data acquired by the image data acquiring unit;

a first reception unit that receives first application identification information, which indicates a first particular application satisfying the first search information, from the search unit of the mobile device operating system;

a second request control unit that requests the search unit of the mobile device operating system to search for a second particular application that is installed on the mobile device with designating a second search information representing a second image format which is different from the first image format, wherein the second image format is an image format convertible from the image data acquired by the image data acquiring unit;
a second reception unit that receives second application identification information, which indicates a second particular application satisfying the second search information, from the search unit of the mobile device operating system;
a display control unit that displays a list of the first application identification information and the second application identification information;
an operation reception unit that receive a user operation selecting one application identification information from the list; and
a conversion unit, wherein in a case where the first application identification information is selected, the conversion unit converts the image data acquired by the image data acquisition unit into the image data having the first image format, and wherein in a case where the second application identification information is selected, the conversion unit converts the image data acquired by the image data acquisition unit into the image data having the second image format; and
a third request control unit that requests the share unit of the mobile device operating system to perform the share function on a selected particular application, which is corresponding to the selected application information selected from the list, thereby requesting the share unit to cause the selected particular application to process the converted image data.

2. The non-transitory computer-readable medium according to claim 1,
wherein the computer is functioned as a second determination unit that determines whether the number of applications corresponding to the application identification information received by the first reception unit is a predetermined number or larger, and
wherein, when the second determination unit determines that the number of applications is the predetermined number or larger, the display control unit displays the options to receive an operation of selecting any one of the applications, which are indicated by the first application identification information received by the first reception unit, without requesting for the search by the second request control unit.

3. The non-transitory computer-readable medium according to claim 1,
wherein the acquisition unit acquires image data that is generated by reading an image by an image reading apparatus.

4. The non-transitory computer-readable medium according to claim 1,
wherein the acquisition unit acquires image data that is generated by shooting an image by a camera of the information processing apparatus.

5. The non-transitory computer-readable medium according to claim 1,
wherein the display control unit displays the options to receive to receive an operation of selecting any one of the applications, in correspondence with processing types indicating processing that can be performed by the applications and data formats that can be processed.

6. The non-transitory computer-readable medium according to claim 1,
wherein the computer is functioned as:
a second display control unit that, when information indicating the selected application identification information is included in both the first application identification information and the second application identification information, displays second options on the display unit to receive an operation of selecting any one of a first processing information and a second processing information, and control the sharing unit to perform selected processing information.

7. The non-transitory computer-readable medium according to claim 1, wherein the data format includes at least one of JPG and PDF.

8. The non-transitory computer-readable medium according to claim 1,
wherein the processing type includes at least of a send process, an edit process and a view process.

9. The non-transitory computer-readable medium according to claim 1,
wherein the at least one of the process type represented by the process information and the data format represented by the format information is displayed as a headline together with the list of the first application identification information and the second application identification information, and
wherein the headline is displayed for each of the first application identification information and the second application identification information.

10. The non-transitory computer-readable medium according to claim 1,
wherein the image data acquiring unit controls a scanner to perform a scanning and acquires image data transmitted from the scanner.

11. The non-transitory computer-readable medium according to claim 1,
wherein the image data acquiring application is a scanning application.

12. A non-transitory computer-readable medium having instructions to control a computer of a mobile device, in which a mobile device operating system and a plurality of applications are installed, including a display unit; and an operation unit, the operating system of the mobile device having:
a share unit configured to perform a share function, which designates share information to a sharing designated application that is one of the plurality of the applications installed on the mobile device, when the share information is designated from a sharing source application that is one of the plurality of the applications installed on the mobile device, wherein the share information includes location information of data to be shared and process information representing a process type of particular process that processes the data to be shared, the particular process is process in the sharing designated application; and
a search unit configured to: search for a particular application from the plurality of the applications installed on the mobile device, wherein search information is designated from the sharing source application, wherein the search information is at least one of process information and format information, the process information represents a process type and the format information represents a data format of date to be sheared, the particular application is possible to function as the sharing designated application and supports at least one of the process type represented by the process information and at least one of the data format represented by the format information;
the instructions controlling the computer to function as an image data acquiring application including:

an image data acquisition unit that acquires image data, in response to a user operation, a first request control unit that requests the search unit of the mobile device operating system to search for a first particular application that is installed on the mobile device with designating a first search information representing a multi-type process, wherein the multi-type process is a process type that processes a plurality of image data;

a first reception unit that receives first application identification information, which indicates an first particular application satisfying the first search information, from the search unit of the operating system;

a second request control unit that requests the search unit of the mobile device operating system to search for a second particular application that is installed on the mobile device with designating a second search information representing a single-type process, wherein single-type process is a process type that processes single image data;

a second reception unit that receives second application identification information, which indicates a second particular application satisfying the second search information, from the search unit of the mobile device operating system;

a display control unit that displays a list of the first application identification information and the second application identification information;

an operation reception unit that receive a user operation selecting one application identification information from the list;

a conversion unit, wherein in a case where the first application identification information is selected, the conversion unit converts the image data acquired by the image data acquisition unit into the image data having the plurality of image data, and wherein in a case where the second application identification information is selected, the conversion unit converts the image data acquired by the image data acquisition unit into the image data having single image data; and a third request control unit that requests the share unit of the mobile device operating system to perform the share function on a selected particular application, which is corresponding to the selected application information selected from the list, thereby requesting the share unit to cause the selected particular application to process the converted image data.

13. A non-transitory computer-readable medium having instructions to control a computer of mobile device, in which an operating system and a plurality of applications are installed, including a display unit; and an operation unit, the operating system of the mobile device having:

a share unit configured to perform a share function, which designates share information to a sharing designated application that is one of the plurality of the applications installed on the mobile device, when the share information is designated from a sharing source application that is one of the plurality of the applications installed on the mobile device, wherein the share information includes location information of data to be shared and process information representing a process type of particular process that processes the data to be shared, the particular process is process in the sharing designated application installed on the mobile device; and a search unit configured to: search for a particular application from the plurality of the applications installed on the mobile device, wherein search information is designated from the sharing source application, wherein the search information is at least one of process information and format information, the process information represents a process type and the format information represents a data format of date to be sheared, the particular application is possible to function as the sharing designated application and supports at least one of the process type represented by the process information and at least one of the data format represented by the format information;

the instructions controlling the computer to function as an image data acquiring application including:

an image data acquisition unit that acquires image data, in response to a user operation, a first request control unit that requests the search unit of the mobile device operating system to search for a first particular application that is installed on the mobile device with designating a first search information representing a first process type, wherein the first process type is one of viewing, editing, sending and multi-sending;

a first reception unit that receives first application identification information, which indicates an first particular application satisfying the first search information, from the search unit of the operating system;

a second request control unit that requests the search unit of the mobile device operating system to search for a second particular application that is installed on the mobile device with designating a second search information representing a second process type which is different from the first process type, wherein the second process type is of viewing, editing and sending one of viewing, editing, sending and multi-sending;

a second reception unit that receives second application identification information, which indicates a second particular application satisfying the second search information, from the search unit of the mobile device operating system;

a display control unit that displays a list of the first application identification information and the second application identification information;

an operation reception unit that receive a user operation selecting one application identification information from the list; and a third request control unit that requests the share unit of the mobile device operating system to perform the share function on a selected particular application, which is corresponding to the selected application information selected from the list, wherein in a case where the first application identification information is selected, the third request control unit requests the share unit to cause the selected first particular application to perform the first process type process, and wherein in a case where the second application identification information is selected, the third request control unit requests the share unit to cause the selected second particular application to perform the second process type process.

14. The non-transitory computer-readable medium according to claim 3, wherein the first request control unit request the second unit to search the first particular application with a first format information that represents a first data format and the first process information, and wherein the second request control unit request the search unit to search the second particular application with the first format information and the second process information.

15. The non-transitory computer-readable medium according to claim 14,
wherein the computer is functioned as:
an acquisition unit that acquires image data; and
a second conversion control unit that converts the image data acquired by the acquisition unit into image data having the predetermined data format, and
wherein the third request control unit requests the share unit of the data converted by the second conversion control unit.

16. The non-transitory computer-readable medium according to claim 15,
wherein the acquisition unit acquires image data that is generated by reading an image by an image reading apparatus.

17. The non-transitory computer-readable medium according to claim 15,
wherein the acquisition unit acquires image data that is generated by shooting an image by a camera of the information processing apparatus.

18. The non-transitory computer-readable medium according claim 3, wherein the computer is functioned as a third display control unit that displays third options on the display unit to receive an operation of selecting a processing type, and wherein, when the operation unit receives an operation of selecting any one of the third options, a fourth display control unit displays fourth options on the display unit to receive an operation of selecting any one of applications corresponding to processing types corresponding to the selected third options among the application identification information received by the first reception unit and the application indicated by the application identification information received by the second reception unit.

* * * * *